United States Patent [19]
Johnson et al.

[11] Patent Number: 5,894,583
[45] Date of Patent: Apr. 13, 1999

[54] VARIABLE TIMEOUT METHOD FOR IMPROVING MISSING-INTERRUPT-HANDLER OPERATIONS IN AN ENVIRONMENT HAVING I/O DEVICES SHARED BY ONE OR MORE SYSTEMS

[75] Inventors: Gavin Stuart Johnson, Aromas, Calif.; Richard Anthony Ripberger, Tucson, Ariz.; Luis Ricardo Urbanejo, Morgan Hill, Calif.; Harry Morris Yudenfriend, Poughkeepsie, N.Y.

[73] Assignee: International Business Machines Corporation, Armonk, N.Y.

[21] Appl. No.: 08/629,661

[22] Filed: Apr. 9, 1996

[51] Int. Cl.[6] ............................................. G06F 11/00
[52] U.S. Cl. .................... 395/868; 395/878; 395/733; 395/739; 395/185.01; 395/183.01; 395/185.09
[58] Field of Search .............................. 395/733–739, 395/868, 878, 185, 183, 200

[56] References Cited

U.S. PATENT DOCUMENTS

| | | | |
|---|---|---|---|
| 4,371,932 | 2/1983 | Dinwiddie, Jr. et al. | 395/841 |
| 4,771,403 | 9/1988 | Maskovyak et al. | 395/834 |
| 4,974,147 | 11/1990 | Hanrahan et al. | 395/182.22 |
| 5,003,462 | 3/1991 | Blaner et al. | 711/207 |
| 5,257,368 | 10/1993 | Benson et al. | 707/1 |
| 5,257,379 | 10/1993 | Cwiakala et al. | 395/651 |
| 5,307,482 | 4/1994 | Bealkowski et al. | 395/183.06 |
| 5,333,274 | 7/1994 | Amini et al. | 395/185.03 |
| 5,357,612 | 10/1994 | Alaiwan | 395/200.46 |
| 5,388,254 | 2/1995 | Betz et al. | 395/182.14 |
| 5,471,609 | 11/1995 | Yudenfriend et al. | 395/182.02 |
| 5,613,066 | 3/1997 | Matsushima et al. | 395/182.02 |

Primary Examiner—Christopher B. Shin
Attorney, Agent, or Firm—Bernard M. Goldman

[57] ABSTRACT

Missing interrupt handler (MIH) software features for supporting a variable MIH timeout for I/O requests issued by an operating system (OS). The MIH timeout is varied to prevent a false indication of a failure in an I/O device operation, which is indicated if the MIH timeout occurs. By extending the MIH timeout, the I/O device is given more time to complete its operation, and the extension is provided when the device control unit (CU), or the OS, determines an I/O operation cannot complete before the shortest available MIH timeout. The length of a primary MIH timeout period is extended to a secondary MIH timeout period in response to the OS detecting that an I/O request has a long command that requires a long operating time in the I/O device, or a signal from the device's CU indicating that the current operation in the I/O device is taking an excessive time without the device being in any error condition.

19 Claims, 14 Drawing Sheets

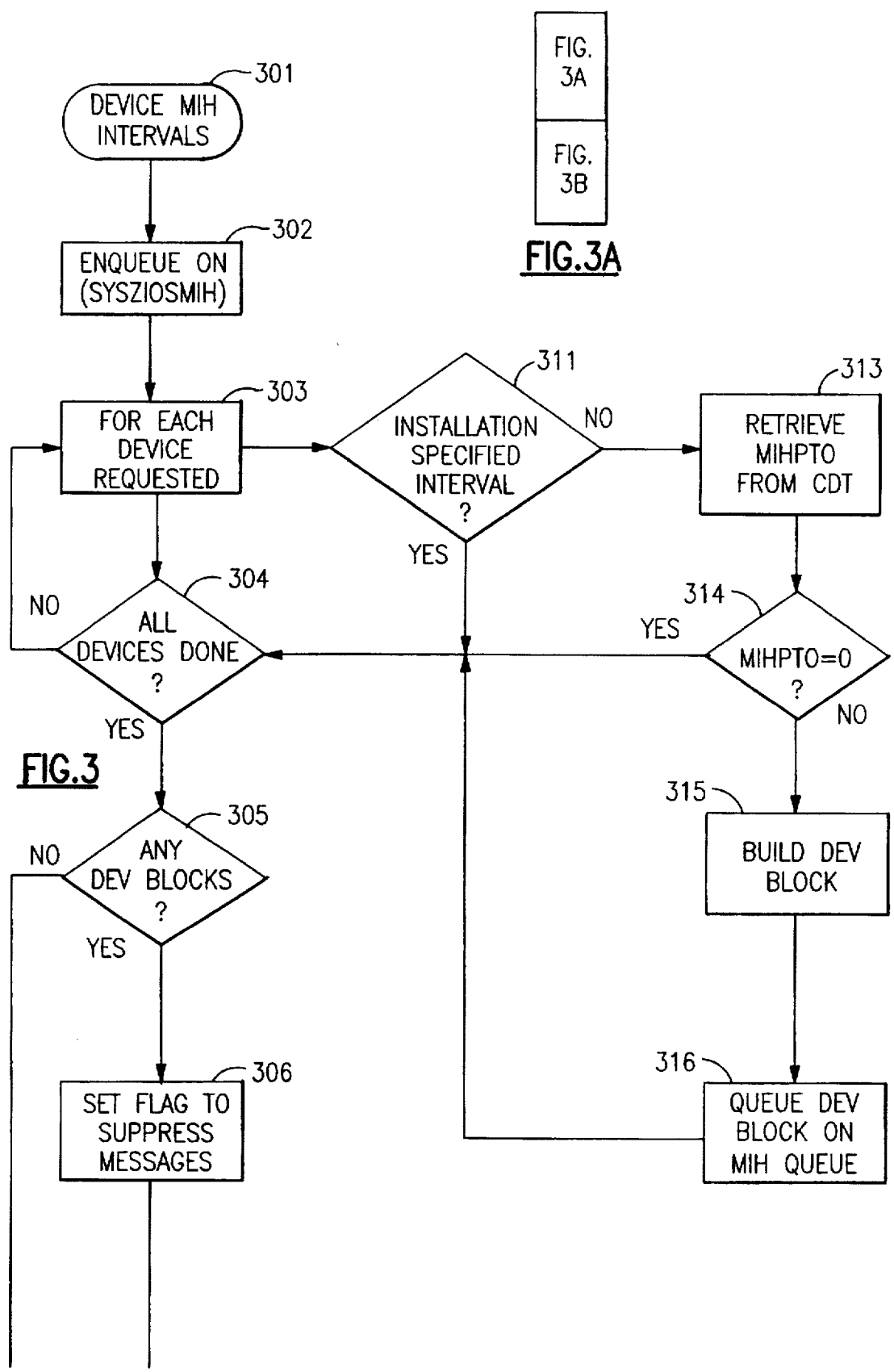

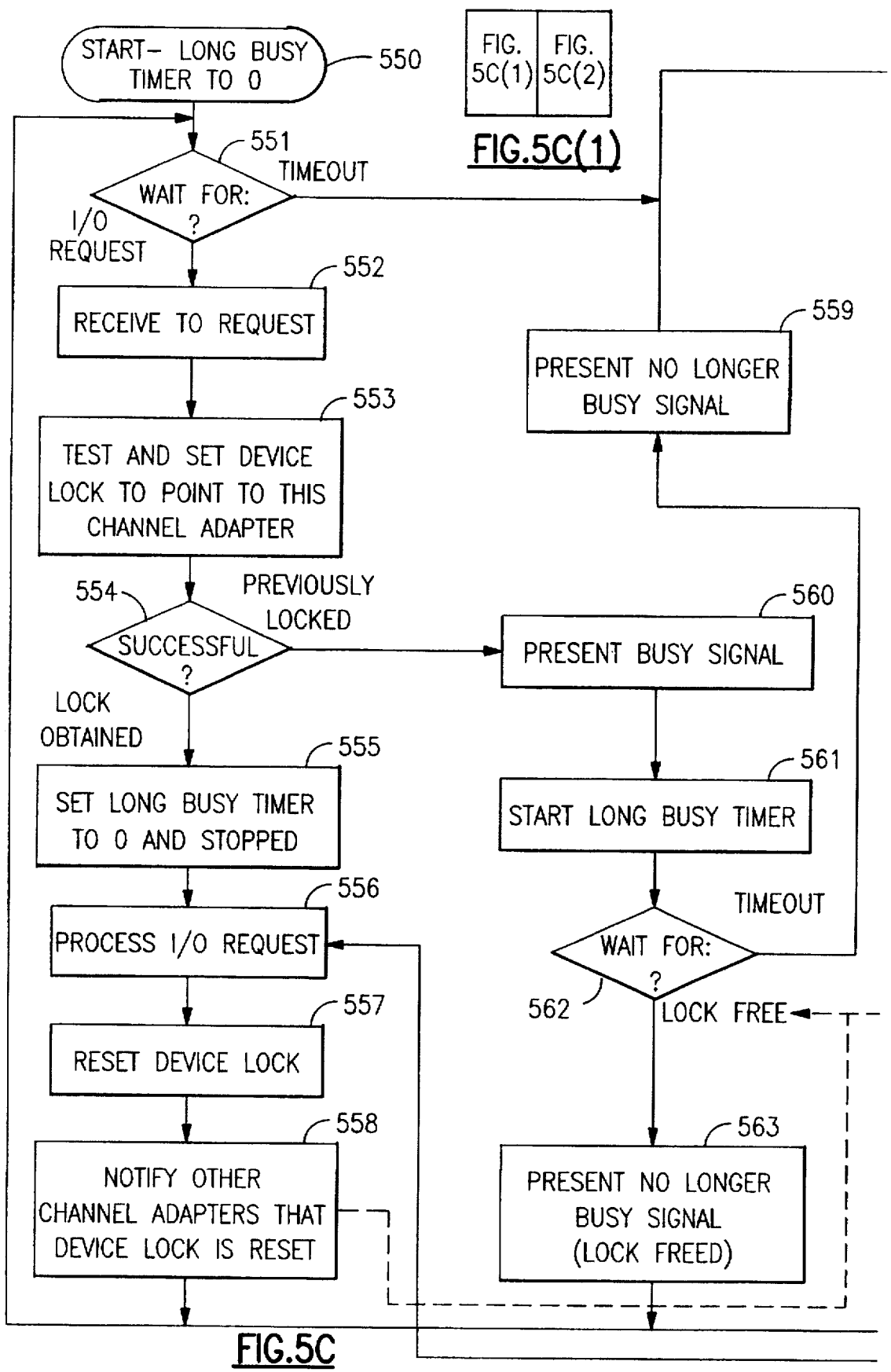

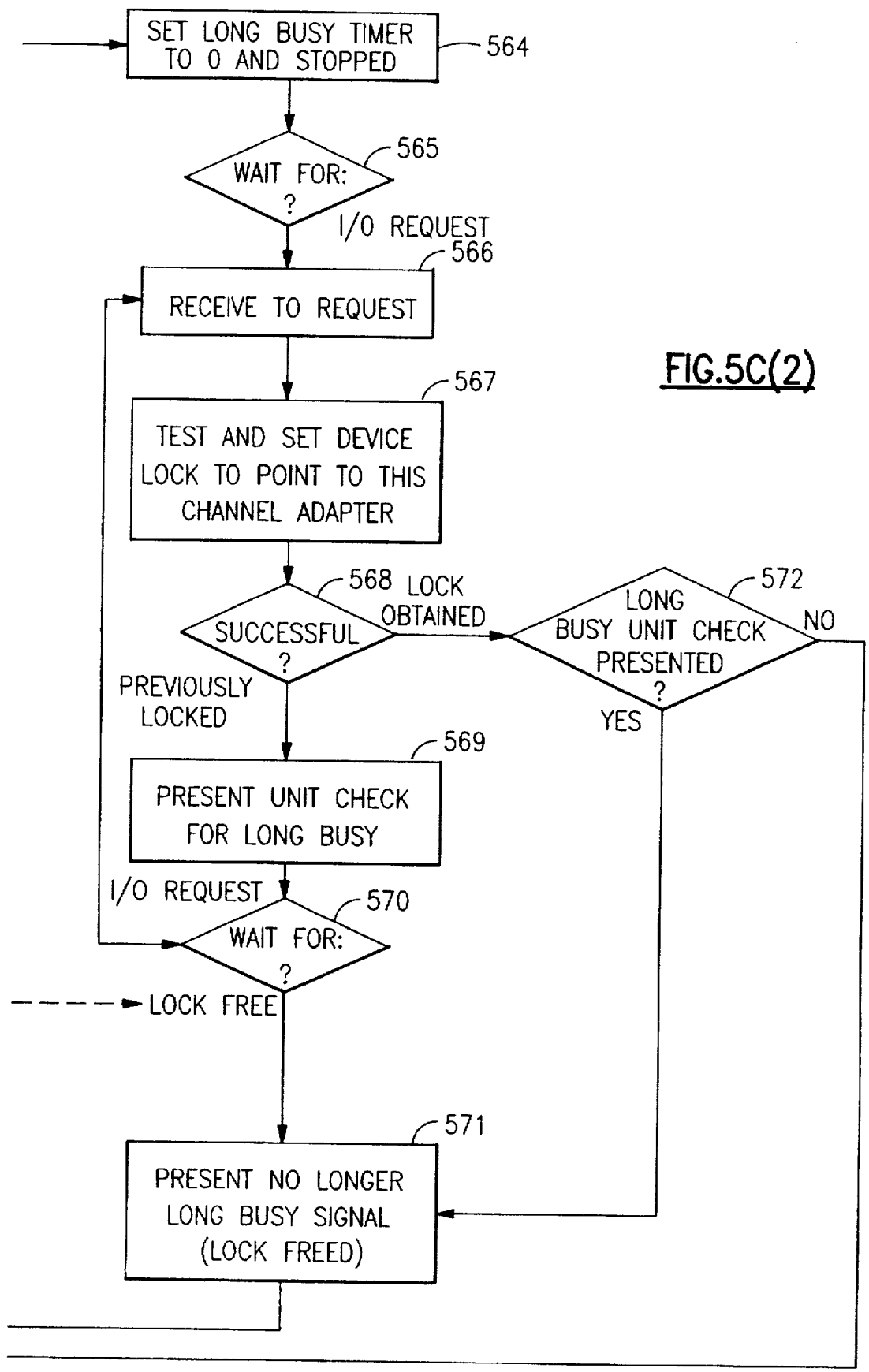
FIG.5C(2)

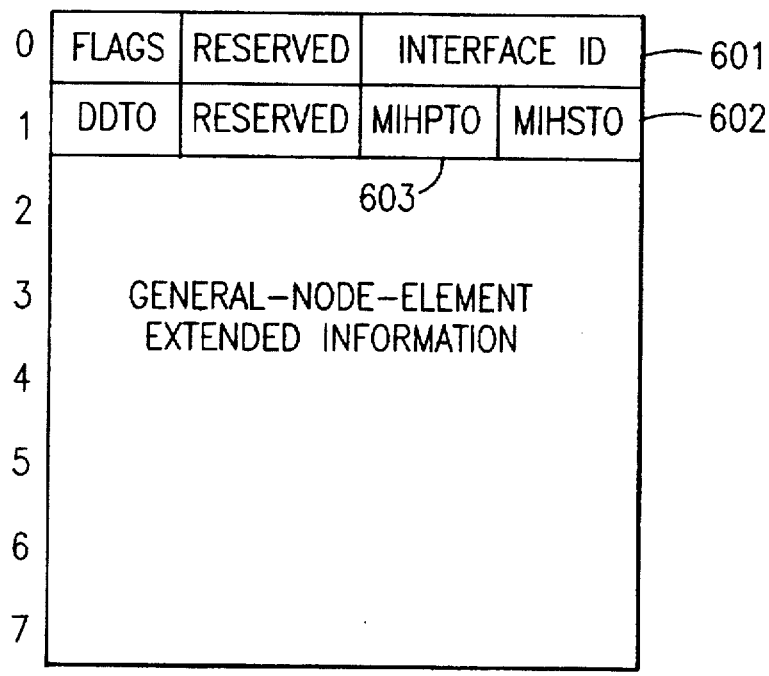
FIG.6A
FIG.6B
| EXPONENT VALUE | VALUE |
|---|---|
| 00 | INCREMENTS OF 1s OF SECONDS |
| 01 | INCREMENTS OF 10s OF SECONDS |
| 10 | INCREMENTS OF 100s OF SECONDS |
| 11 | INCREMENTS OF 1000s OF SECONDS |
FIG.6C

VARIABLE TIMEOUT METHOD FOR IMPROVING MISSING-INTERRUPT-HANDLER OPERATIONS IN AN ENVIRONMENT HAVING I/O DEVICES SHARED BY ONE OR MORE SYSTEMS

FIELD OF THE INVENTION

This invention is related to missing interrupt handler (MIH) timeout controls (generally implemented in software) found in operating systems (OSs) for the detection of missing interrupts which are indicative of a potential failure in the operation of an I/O device to fulfil an OS I/O request. This invention prevents certain erroneous indications which may be caused for an I/O request when it is unduly delayed by other contending OS I/O requests, which are unknown to the waiting request and may cause a MIH (missing interrupt handler) timeout to indicate a potential device-operation failure—by the lack of receiving an operation-completion interrupt for a requested I/O device before the MIH timeout occurs.

INCORPORATED APPLICATIONS

The subject specification is related to specification PO9-96-028 having Ser. No. 08/629,702, now patented U.S. Pat. No. 5,758,190, and specification PO9-96-032 having Ser. No. 08/631,689, now patented U.S. Pat. No. 5,768,620, both filed on Apr. 9, 1996. The entire specifications of applications PO9-96-028 and PO9-96-032 are incorporated by reference into the subject application which was filed on the same day as applications PO9-96-028 and PO9-96-032.

BACKGROUND OF THE INVENTION

In all computing environments, interrupts from various I/O devices may go unrecognized by an OS which requested an operation by the device, either because: the I/O device failed to present the interrupt due to a component in the path from the device to the OS failing to properly transfer the interrupt, or the OS failing to recognize the interrupt when presented.

Failure to detect a missing interrupt may cause operations in a data processing system to slow down and ultimately cease when a critical resource cannot be released until the interrupt occurs or the processing associated with the missing interrupt is terminated. Such detection failure may require an unscheduled system restart (IPL) to make the resource available again. Manual attempts to locate the request for the resource on some queue usually take longer than the requesting customer can afford to wait.

To reduce the catastrophic impact of a missing interrupt to the system, a method was developed to detect lost interrupts and allow failed operations to be terminated, recovery mechanisms deployed, and failed operations restarted or to terminate the job that initiated the operation with an error. This mechanism is called the Missing Interrupt Handler (MIH) and has the ability to 'time' I/O operations that are in progress. Actually, this is not a time measurement but rather a limit on the length of time that is considered 'normal' for the longest possible I/O operation to the device. This does not mean that all operations should take a long time but rather, all operations that exceed this time are to be considered abnormal. The Missing Interrupt Handler is therefore a 'safety net' under the system to shield the host from the effects of a lost interrupt.

Initially, only a couple of timer values were established to differentiate between slower devices (unit record) and faster devices (DASD) which allowed only limited ability to tailor timer values for different machines. Two timer values were not adequate and additional individual MIH timer values have been implemented which can be adjusted to meet the needs and response requirements of various devices.

Over time, the capabilities of the MIH component have been expanded to allow dynamic modification of the MIH timeouts, including the ability to place time limits across all I/O request processing including queuing time and error recovery procedure (ERP), instead of just active time as originally implemented. However, today's Missing Interrupt Handler components of computer operating systems have deficiencies.

In today's operating systems there are various default MIH intervals based on device class (i.e. DASD, TAPE, etc . . . ). However, within each device class there is a great disparity between the recommended MIH times for different device types. For example, on tape devices the recommended MIH detection interval for the different model tape devices varies from 3 minutes for S/390 3420 tape device to 20 minutes for a S/390 3490E tape device. This variation in MIH time is due to the varying amounts of capacity a tape can contain and the maximum physical speed that the medium can be moved.

The MIH detection interval must be greater than the time to execute the longest command at the device (e.g. forward space file, rewind/unload, etc . . . ). Another example is for DASD devices. The MVS (Multiple Virtual Storage, IBM's premier operating system for S/390 machines) operating system has a 15 second default MIH time for DASD devices. This usually only needs adjustment by a system operator due to special characteristics of the work load or applications using a particular device. For example, a JES2 (job entry system 2) checkpoint data set may get reserved for long periods of time during initialization, but high availability applications need to be notified after only a few seconds if their I/O has not completed in order for the application to attempt an alternate device and still make transaction time requirements. However, new DASD characteristics further complicate the issue of choosing an MIH detection interval. The IBM 3990 DASD has internal error recovery functions that can take 30 seconds to complete. If an MIH condition is detected during this recovery, the host recovery actions can cause severe problems at the control unit. Thus, it is recommended for the 3990 DASD that system operators set a 30 second MIH interval. Additionally, other devices may be defined to the system as if they are DASD devices. An example of this may be the IBM 3995 optical devices; some operations on these devices require the mechanical removal and mounting of optical media, which can take several minutes. Complicating matters further, any time new devices are added to a computer system, the existing MIH customization information may need to be updated to insure proper operation of such devices.

An additional problem with operating system MIH handlers is that the MIH times are too long. As discussed above, MIH times need to be set by the customer for each device type based on the characteristics of that device. If the longest commands that can be executed are expected to take 20 minutes (i.e. a rewind/unload) then all hang conditions are detected after the 20 minute interval, even though most simple data transfer commands can be expected to execute in seconds. Elongated error detection times impact the customer, in that they degrade system reliability and availability. If a new device with improved technology is substituted for the old device the MIH time must be manually adjusted to meet the new requirements.

Additionally, with today's devices and MIH capability, all commands are timed at the same MIH interval. This applies also to special control and recovery commands that are used by the operating system during recovery and reconfiguration actions (i.e. set path-group-ID, sense path-group-ID, reset allegiance, assign/unassign, control access, etc . . . ). When these commands are issued by the operating system, critical system resources may be held which may delay the execution of other normal customer work. The addition of special timer code for the recovery of these commands is extremely costly to the development of the system and increases the cost of the product.

As described above, computer systems require the customer to manually set the MIH times based on the physical characteristics of the device. For example, the customer is responsible for knowing that S/390 3995 Optical Library device is really defined as an S/390 DASD 3380 device and that the MIH intervals must be set high enough so that MIH conditions are not detected for normal staging/destaging of the optical media. Additionally, if a set of tape drives are added or upgraded, the MIH times need to be adjusted based on the speeds and capacities of the tape drives. This manual process is error prone. If accidentally omitted false MIH conditions are detected, jobs may fail.

Also, MIH specifications need to be synchronized with physical I/O configuration definitions, and updated across system configuration changes done both dynamically as well as by system restart. If the MIH times are not updated correctly, system RAS will be degraded. The fact that customers have to be aware of the MIH detection for different devices adds to the cost of systems management and the overall cost of computing.

System Environment: FIG. 5a shows a multiplicity of hosts (510). Each host is a general purpose computer system containing one or more central processing units (CPU (511)), responsible for executing programs consisting of central processor instructions, and an I/O channel subsystem (512) responsible for executing channel programs and managing the transfer of information over one or more channel paths (513) between the host (510) and one or more I/O subsystems (520). In the preferred embodiment, host computers are IBM S/370 or IBM S/390 computer systems attached to I/O devices via ESCON or OEMI I/O channel interfaces. However, the computers may be of any type and may in fact be a multiplicity of types. Similarly, the channel paths may be a multiplicity of types, provided the interface is supported by the attaching host and I/O subsystem. The topology of the channel paths is potentially unique to the type of I/O interface.

Each I/O subsystem (520) consists of a control unit (521) responsible for managing one or more devices (530) connected to one or more hosts (510). I/O devices are attached to the control units via one or more device paths (531) that are supported by the devices and the control units for the communication of information. In general, the control unit adapts the I/O interface supported by the device (i.e. device paths (531)) to the I/O interface supported by the host (i.e. channel paths (513)).

Internal to each control unit (521) are facilities which are used to manage the interaction between the multiplicity of hosts and the multiplicity of devices. Each channel path is attached to a channel adapter (524) within the control unit which contains the facilities required to communicate on the associated channel path. A shared memory (522) is present in each I/O subsystem (520) that is accessible by I/O processing elements within the I/O sub-system that control the channel adapters (524). This shared memory contains a block of information associated with each device which is referred to as "device n lock data" (523).

Within each host (510), an OS program is executed by any of its CPUs (511) which performs the operations to cause the channel subsystem (512) to issue I/O signals to a selected device (530) attached to a selected channel path or set of channel paths (513). The OS program is designed such that it monitors the duration of the I/O operation from the time the request is presented to the channel subsystem (512) until a response is received from the channel subsystem (512) indicating that the I/O operation has completed. If the elapsed time of an I/O operation exceeds some threshold, the program detects a missing-interrupt timeout as described in prior U.S. Pat. No. 5,388,254 assigned to the same assignee. This MIH program function is intended to detect I/O operations that have failed to complete due to some unreported condition, thereby avoiding an indefinite suspension of processes that depend on the completion of the I/O operation.

Within the channel subsystem, an I/O request can be queued for a selected device. The I/O request causes a communication to be initiated over a channel path between the channel subsystem and a selected control unit as a result of queuing the I/O request while waiting for a requested device to perform the request. While an I/O request is being processed by the channel subsystem, the OS program is allowed to continue execution of other work. At the completion of the I/O operation, the channel subsystem interrupts the OS program to present the status of the completed I/O operation.

The control unit manages concurrent requests to each device it controls. If the control unit decides to allow an I/O request made by a host, the command is accepted from the channel and is processed for the device selected by the channel. If the control unit decides to not allow an I/O request made by a host because of concurrent activity, the command is rejected with a "busy" indication causing the I/O request to be queued in the channel subsystem. When the control unit determines that it can perform the command after having previously presented it with a busy indication, the control unit presents a "no-longer busy" indication to cause the channel subsystem to reissue the queued I/O request. The requesting OS program is not aware of this interaction except to the extent that its I/O request has not been signalled as having been completed. The algorithm normally used by a control unit to present a busy indication is discussed subsequently. This invention describes enhancements which increase system efficiency by allowing a reduction in the time limit used by the OS program to reliably detect for missing interrupt signals when one or more OSs are making concurrent I/O requests to the same control unit.

Management of Concurrent I/O Requests: The control unit determines the number of concurrent I/O requests that can be in progress at the control unit for a given device. Often, devices have a requirement that I/O requests be serialized to ensure predictable results on a medium handled by the device. Other design constraints within the control unit may also place limits on the number of requests allowed to concurrently be performed for a device.

FIG. 5B shows a process that can be employed to limit to one the number of concurrent I/O requests accepted, which causes a serialized execution of concurrent requests at the device. This policy is enforced by a device lock protocol used by the channel adapters, in which the adaptor performs an atomic "test and set operation" on a lock associated with the requested device in a lock data block 523 for the device. This lock test and set protocol is performed before beginning any I/O operation by the device. If the test and set operation is successful (finds the device is available), the I/O operation is accepted and processed by the device. If the test and set operation is unsuccessful (the device is not available), the I/O request of a channel adapter is presented with a busy indication. A channel adapter is successful when it obtained a lock for the needed device (by setting a lock bit associated with the device). At the completion of the device operation, each channel adapter that was signaled a busy indication is then signalled a "no longer busy" indication, so that I/O requests queued in the channel subsystem can again be reissued for the device. This cross channel adapter communication is indicated by the dotted line in FIG. 5B. The implementation of the presentation of the "no longer busy" indication may require consideration of "fairness" mechanisms to prevent certain hosts from continually preventing other hosts from accessing the device. Variations of this method may be provided for different interface architectures (e.g. SCSI untagged and tagged queuing) where a serialization queue is built in the control unit instead of using a channel subsystem queuing capability.

Bounding of Queuing Durations: A problem that arises with the busy/no longer busy method previously discussed for serialized concurrent I/O requests is that the time required to execute an I/O operation from the host's perspective is NOT a function of time needed for execution of the requested I/O operation at the control unit (CU). That is, the execution time from the host OS perspective is the actual CU/device execution time plus waiting time (during which the CU is executing other intervening I/O operations for other hosts). In effect, without OS knowledge of all I/O operations in the queue for the device, it is not possible to determine the duration of a requested I/O operation for the purpose of determining an appropriate missing-interrupt-timeout value. Given some degree of fairness in the resolution of concurrent accesses and some bound on the number of concurrent requests, a statistical analysis can be performed to pick a duration which will have a high probability of ensuring that the failure to detect the completion of an I/O operation is due to some failure condition and not as a result of concurrent access requests.

For example, assume a given disk device normally executes any command in less than 10 milliseconds. If most I/O requests have no more than 10 commands (10 I/O channel instructions), and there are generally no more than 10 hosts that will get relatively equal service, then multiplying the 10 milliseconds * 10 commands * 10 hosts gives an expectation that an I/O request should take no longer than about 1 second. This number would then be increased by some factor to handle exceptional conditions within some high degree of probability, say to 15 seconds.

The problem is compounded when there is a wide variation in the expected execution durations of the I/O operations for a given device because the statistical analysis for predicting a resolution of concurrent requests must consider the worst case I/O operation execution times, further increasing the discrepancy between the duration of a "short" I/O request and the missing-interrupt timeout.

For example, assume that for a given disk device, a typical command normally executes in less than 100 microseconds, but an outboard copy command (copy the content of this disk to another disk) executes in less than 5 minutes. If we determine statistically that an I/O request will not be queued for longer than eight concurrent requests (i.e. this host gets a turn at least once out of every eight I/O requests processed), then we could estimate that, worst case, the queuing time is 7×5 minutes=35 minutes. If this host is executing a typical command, the missing interrupt timeout estimated as the sum of the queuing time and the command execution time would be 35 minutes and 0.0001 seconds, or alternatively, about 35 minutes. One might also consider the probability of having seven different hosts issue seven concurrent outboard copies and arrive at a conclusion that a smaller timeout limit than 35 minutes is possible, say n minutes where n<35, based on the probability of all the sharing systems initiating a full copy at the same time.

Often, the program must perform additional I/O when a missing interrupt is detected. These I/O requests may be just as likely to encounter a queuing problem and consequently must have the same missing interrupt timeout applied. For the case where the device is in fact broken and is no longer capable of responding to the host, it is easy to see where it could take tens of minutes before the program comes to the conclusion that the job has failed and must be rerun.

In certain environments, the program may not be able to wait for the duration of time prescribed by such statistical methods and still meet its requirements for real time processing. In other cases, the missing interrupt timeout and resulting recovery is of such duration as to create operational difficulties (e.g. processing does not complete within required windows).

Prior MIH detection systems have not worked well for single OS data processing systems in which an MIH process can be the source of error indications when certain scenarios happen. For example, a false indication would occur in a scenario where a long I/O command (a command requiring a long period of I/O operation) was issued to an I/O control unit as the last command of an I/O program, and before the last I/O command is completed, another I/O program is attempted to be initiated by the OS with a short command to the same device. In the prior system, the long command would signal partial completion when the long command is accepted at the control unit. This caused the next request to the I/O device to wait until the device completed operations for the first request. (To those skilled in the prior S/390 I/O architecture, this is known as redriving on primary status, which allows prompt termination of a job and the initiation of a new job following a tape rewind/unload command). If the second I/O request were allowed to start before the first request finished, and the operating system tried to adjust the MIH timeout for the presumed active short command, a false indication would be detected because of the lack of OS knowledge concerning the execution time for the previous long command. This short timeout then would falsely indicate a missing interrupt. No interrupt was actually missing because the short command was not yet started by the device due to the device still performing the prior long command (and neither of these commands could yet provide any completion interrupt).

SUMMARY OF THE INVENTION

This invention is preferably used in a computer arrangement having multiple Operating Systems (OSs) which share one or more I/O Control Units (CUs) and I/O devices. The OSs are considered hosts of the I/O CUs and devices.

This invention provides novel system processes and features that operate with MIH (missing interrupt handler) software to prevent the MIH software from falsely detecting I/O device failures, which may be a problem in systems having I/O devices shared by multiple OSs. The problem occurs when one OS makes an I/O request for use of a particular I/O device, and the request must wait a long time for device to become available, which wait may exceed a predetermined MIH timeout that causes the OS to have a failure indication for the requested I/O device—when in fact that device has not failed but merely is processing requests for other OSs. The MIH detection software starts an MIH timeout when its OS issues an I/O request, and indicates a failure of that I/O device if a successful-completion interrupt is not received from that I/O device before the expiration of the MIH timeout—that interrupt is thereby declared missing.

The subject invention provides a variable MIH timeout period for each delayed I/O request—as opposed to the prior fixed length MIH timeout period previously used. If the end of the variable MIH timeout period is reached without the requested I/O device providing a successful-completion interrupt signal to the requesting OS, an MIH timeout occurs which triggers an I/O device failure indication in the OS. The invention varies the MIH timeout period in predetermined extension increments controlled by a novel long-busy interrupt signal provided to the requesting OS by the requested I/O control unit (CU) delaying the I/O request. The long-busy interrupt causes the OS to add an MIH timeout extension to the previously determined MIH timeout period. A timeout of a threshold timeout period in the CU occurs before the expiration of the current MIH timeout period in the OS to allow extension of its MIH timeout period before it can timeout to trigger an I/O device failure indication.

The first MIH timeout period for an OS issued I/O request is herein called a "primary MIH timeout period". The I/O CU-device receiving the I/O request generates a threshold timeout near the end of the primary MIH period to signal that the request is being unduly delayed. The threshold timeout for an I/O request cause the CU to generate and signal to the requesting OS a long-busy I/O interrupt with status information; the status information indicates to the OS the CU's threshold-timeout reason for the I/O delay. In response to the long-busy interrupt, the OS extends the MIH timeout period by a timeout extension increment.

The preferred embodiment uses one CU timeout threshold per delayed request. However, this invention allows a CU to be designed to provide a sequence of any number of timeout thresholds for each CU delayed request, wherein each timeout threshold occurs sufficiently before the end of a current MIH timeout extension period to allow the OS to be signalled on the threshold occurrence and for the OS to invoke a next MIH extension before the current extension can timeout. The MIH I/O device failure indication is provided only on the timeout of the MIH timeout period, whether extended or not.

The length of time for each of plural MIH extensions for a delayed I/O request may, but need not, be equal to each other, and they are different in the preferred embodiment, where a first (primary) extension is much shorter than a second (secondary) extension, for which most requests are expected to successfully complete during the short primary timeout. The long secondary extension period is used occasionally only where an I/O request using a device is using long I/O commands that cause long delays to a waiting request for access to the same I/O device.

In more detail, the long-busy interrupt signal is generated in the CU when the associated I/O request is delayed beyond its current threshold timeout period. Such delay is usually caused by the requested I/O device being busy handling other I/O requests that are unknown to the OS of the delayed I/O request. The CU threshold timeout period is determined in relation to the current MIH timeout period in the OS, wherein the CU threshold timeout must occur sufficiently before the timeout of the current OS MIH timeout period to allow time for: 1) the CU to generate the long-busy interrupt signal (i.e. CU threshold-driven interrupt signal) with status information, and 2) time for the OS to respond to the interrupt and status information by extending the current MIH timeout period before it times out (ends) to indicate an I/O device operation failure to the OS.

Also, the long-busy interrupt signal may be provided by a CU at the CU threshold timeout when the CU knows the current device operation is for a long command which will cause a long delay to a request waiting for the same I/O device. Furthermore, this invention may also be used in systems using only a single OS where any of its I/O requests may cause a very long wait to a later issued I/O request for the same device, such as when the request using the device contains a long command which would cause the MIH timeout for the later delayed command, such as for example when the request using the device is executing a tape rewind command. In this case, the OS's knowledge that it has issued an earlier incomplete request with a long command may cause it to extend its MIH timeout period without any CU long-busy interrupt.

Alternatively, the CU knows the operation codes of long commands it receives for a current I/O request using a device, and can use this information to generate a long-busy interrupt to the issuing OS to extend the MIH timeout period for a request waiting for the same device.

In systems not directly supporting a long-busy interrupt, it may be simulated by using another type of interrupt with status information. For example, the long-busy interrupt may be simulated by using an error-check interrupt with status information (e.g. a special interrupt code) indicating to the receiving OS that the error-check interrupt is really a long-busy interrupt.

The time length of an MIH timeout extension period may be indicated by a respective MIH extension timeout value stored for each OS, and each CU threshold timeout period may be indicated by a respective CU threshold timeout value stored in the CU.

The preferred embodiment supports a CU which has a plurality of channel interface adapters in which each adapter independently manages one delayed I/O request at a time received on a I/O channel path connected to that adapter requesting a particular I/O device which is currently not available. All adapters in the CU may be currently busy with different devices simultaneously performing different I/O requests.

The preferred embodiment also supports each adapter in a manner that allows the adapter to terminate its handling of a delayed I/O request whenever the request is determined to be excessively delayed, which may be determined by the request being delayed up to a threshold timeout, which then initiates a long-busy interrupt for signalling the excessively delayed to the OS which issued the delayed I/O request. The first threshold timeout is the only threshold provided for any excessively delayed request in the preferred embodiment. Then the CU/adapter terminates its handling of the excessively delayed I/O request and then shifts the entire responsibility for handling the excessively delayed request back to its issuing OS, in response to the long-busy interrupt to the OS. Then the OS then may put (or retain) the I/O request on an OS software I/O queue while awaiting a signal that the required device is available before reissuing the request again to the I/O subsystem.

It should be understood that the described adapter protocol (for shifting responsibility for handling excessively delayed requests back to the issuing OS upon the timeout of the CU threshold) is an optional protocol in relation to this invention, which is based on a recognition by the issuing OS that a request will be excessively delayed in the I/O subsystem so that the request's OS MIH timeout period must be extended to avoid a false device failure indication, whether or not the responsibility for handling the request is then ended at the CU.

In any case, in this invention extensions may or may not be used for a particular request, which causes a variable OS MIH timeout period. It is extended only if the request has not completed at the CU threshold which is only then communicated to the OS, and the MIH timeout period then continues to run with the expectation that the requested I/O device will become available before the end of the extended MIH timeout period, which timeout would declare the I/O operation to have failed. Hence, with this invention, the MIH timeout period may be extended by none, one or more additional extension increments, as needed, to avoid a false device failure indication in the OS.

Thus if the requested I/O device becomes available before the first (i.e. primary) CU threshold time is exceeded, the MIH timeout period for a delayed I/O request is ended by a successful completion interrupt from the device. Then the delayed request contends in the CU for the next use of the I/O device with any other concurrent I/O request(s) from other OS(s) in the CU, and one of such request(s) is then selected by a test and set (or compare and swap) protocol in the CU using a well-known race technique to obtain the lock on that I/O device for selecting which I/O request will next get to use the device. (The well-known contention by I/O requests in a CU use a respective lock bit for each of plural I/O devices, in which only one of the contending requests will set a device lock bit determines which one of the I/O requests is to be given the next use of the device.)

Thus in the preferred embodiment, if the CU threshold time is exceeded by the waiting I/O request, it thereafter waits only in an OS queue, the I/O request can no longer contend in the CU for the next I/O device availability, the I/O subsystem is freed of that request, and the CU resources used by the request are then available for use by another I/O request. Later when the OS receives a completion interrupt from the requested I/O device, the OS re-drives the waiting I/O request by again re-issuing it to the I/O subsystem so that it can again contend in the CU for the use of the requested I/O device.

Although the preferred embodiment uses a CU protocol in which the CU ends its responsibility for the handling a delayed request after one threshold is reached (at the end of the primary MIH timeout period), this invention comprehends other CU protocols in which the CU maintains its I/O request handling responsibility for plural MIH extension periods (and for plural corresponding CU threshold periods). That is, this invention comprehends use of its variable MIH timeout periods with other CU protocols that have I/O requests remain in the I/O subsystem for more than one CU threshold period during which the I/O requests are able to contend in the CU for use of requested devices, and the handling responsibility is transferred back to the issuing OS after plural MIH timeout extension periods. Furthermore, this invention also comprehends having the CU maintain its received I/O request in a contendable state for the entire MIH timeout period without transferring the handling responsibility back to the issuing OS for any waiting I/O request.

Thus this invention allows use of a variable MIH timeout period having any finite number of MIH timeout extensions, and there will be one less number of CU threshold timeouts than number of MIH timeout extensions. For example, if the MIH maximum time period has three extensions, there will be two corresponding CU threshold timeouts. Thus, a timeout period of three MIH extensions for any waiting I/O request may be implemented by a single MIH timer, and the corresponding two CU threshold timeouts may be implemented for a CU received request by a single CU timer. The first two CU threshold extensions timeout during the first two MIH extension periods, respectively, and the third MIH timeout extension begins in response to the second CU threshold timeout.

It is apparent from the above examples that the invention may have any number of OS MIH timeout extensions, and one less number of CU thresholds. Each CU threshold timeout initiates the next OS MIH extension, and each CU threshold timeout period is set to end shortly before a corresponding MIH timeout extension. The time between any CU threshold timeout and its corresponding MIH timeout must be sufficient to allow the CU to send an long-busy interrupt communication to the OS (associated with a CU waiting I/O request) to extend the MIH timeout period by its next time extension before the MIH timeout for the current MIH extension can occur (declaring a failed I/O device).

A long command, with no following chained command, is sometimes referred to as an "asynchronous immediate command". Its busy state remains for a very long time at the requested device, or at its control unit until the requested device completes the requested operation.

This invention may provide a long busy state at the device, or at its I/O control unit for commands which require a channel program execution time exceeding some predetermined minimum time.

In an environment of multiple OSs sharing an I/O device, a requesting OS program is not aware of processing performed by the channel subsystem for another I/O request for the same device, and consequently the OS is oblivious to any I/O request queuing that may be occurring in the channel subsystem or within the control unit. Furthermore, the channel subsystem is unaware of the amount of I/O request queuing that is occurring for other OSs (or within the control unit). One way to resolve this dilemma is to make each OS aware of request queuing when the queue is of sufficient duration.

If we consider a device which uses commands with similar command execution times (i.e. no command which has a significantly different command execution time), an ideal situation would be to report any queuing that is going to exceed the worst case execution time of any appropriate I/O request. In this case, the MIH timeout would be set to slightly larger than the worst case expected execution time from the prospectus of the OS. If the OS did not receive an indication that an I/O operation has completed or that excessive queuing is occurring, then it would assume that an interrupt has been lost.

A practical MIH timeout is on the order of several times the worst case time for executing a typical command.

This invention includes a Long Busy Protocol for handling long executing commands in I/O requests. There are non-error conditions, such as excessive queuing durations, which can result in significantly long processing times from the prospective of the requesting OS (even though the command is not yet executing in the requested device), and this invention can be used to handle I/O commands of any duration from the OS perspective. More specifically, this invention notifies the requesting OS when excessive queuing exists for a request, so that the OS can adjust its MIH timeout to an expected duration of the I/O request being issued plus a time threshold based on what the I/O subsystem reports as excessive queuing. Given that excessive queuing is infrequent, the overhead of reporting an excessive queuing condition has little overall impact on system efficiency. As such, the invention allows the OS to use a relatively short MIH timeout for normal short command processing, while still allowing longer MIH timeouts to be used for long duration command processes that may occur.

It is an object of the present invention to provide a signalling process which enables a requested I/O device to signal multiple host OSs when a long running I/O command is being performed by a device that receives another I/O request from one or more other OSs that share the requested device.

It is a further object of the present invention to provide short granular MIH detection timeouts for handling most missing interrupts.

It is another object of the present invention to provide for granular MIH timeouts for use by one or more OSs sharing the same I/O device.

It is a still further object of this invention to eliminate previously required manual customization of MIH timeout values in an OS when I/O configurations are modified by adding new devices, renaming devices, moving devices, or applying a new service to existing devices.

In a preferred embodiment of this invention, each I/O command for device operations is classified into one of two classes, short and long, according to the expected execution time of the command-including any internal recovery processing time and queuing time caused by busy conditions for the command. Short commands normally execute in milliseconds, such as a disk seek command. Long commands may take many seconds/minutes to execute, such as a tape rewind command.

Two MIH timeouts are assigned in relation to the execution of I/O requests (i.e. channel programs): a PRIMARY MIH timeout and a SECONDARY MIH timeout. Each timeout starts when an I/O request is issued to the channel subsystem by an OS, such as when a processor executes a "start I/O", or a "start subchannel" instruction. Each I/O request containing only short duration commands is expected to execute during an assigned PRIMARY MIH timeout, and each I/O request having at least one long duration command is expected to execute during an assigned SECONDARY MIH timeout. These MIH timeouts are defined for each I/O device, and hence they may differ from one device to the next.

The primary MIH timeout ends after completion of the longest expected execution time for most I/O requests, and this MIH timeout includes any internal recovery processing time and queuing time caused by busy conditions for any of such commands. The secondary MIH time period (interval) ends after completion of the execution time for the I/O requests containing one or more long commands. A long command has an execution time which is longer than the primary MIH timeout but is shorter than the secondary MIH timeout.

This invention provides a new I/O signal for I/O devices; it is herein called a "long busy" signal. Whenever a device is executing a long command for an I/O request, the device is herein defined to be in a long busy state, which exists for the duration of the I/O request. As long as no long command has been executed for an I/O request, the device is not considered to be in the long busy state. Whenever another I/O request is presented to an I/O device in the LONG-BUSY state, the device rejects the I/O request with "long-busy" status information. In the preferred embodiment's S/390 I/O architecture, it is signalled by the device controller sending the processor I/O subsystem a "unit check status" signal with "sense data".

Thus, each I/O command (defined in any I/O computer architecture for its usable device types) is classified by this invention as either a "short duration I/O command" which completes within the bounds of an assigned primary MIH timeout, or as a "long duration I/O command" which completes after expiration of the primary MIH timeout but before expiration of the secondary MIH timeout, when both of these timeouts are started when the OS issues the start instruction for the I/O request having the commands.

The preferred embodiment herein uses the S/390 architecture in which I/O commands are defined by channel command words (CCWs) interpreted by an I/O processor in an I/o subsystem of a central processor complex having one or more CPUs, and any CPU may initiate I/O requests.

Each I/O device has a "self description data block" stored in a control unit to which the device is connected. Each device's self description data block is modified by this invention to include both a primary MIH value and a secondary MIH value for the associated device. Also, the self description data block contains two lists of commands, one list for short duration commands and a second list for long duration commands. Any device's self description data block may be optionally obtained by a CPU executing a "read configuration data" CCW, for example, to obtain the command lists or the two MIH intervals.

When an OS initializes its on-line devices (devices to which the OS can send I/O requests), validation operations are performed to determine that the devices indeed exist and are defined correctly to the OS. Part of this initialization process obtains the self description data block for each device and builds a software table that represents the physical I/O configuration available to the OS. The device's self description data may optionally include a primary MIH time value and a secondary MIH time value. If the device's self description data block contains a primary MIH time for which the customer did not explicitly specify an overriding MIH time interval, a default primary MIH value is assigned therein for the device. Similar configuration processing is performed for any I/O device that is varied on-line after system initialization.

Each I/O request has an associated channel program comprised of CCWs. The channel program should complete execution within the primary MIH time interval if it does not contain any long commands. If the channel program contains any long command(s), it should complete within the secondary MIH interval. After an I/O request has been active for the duration of one primary MIH time value, the OS invokes a device dependent MIH exit to perform a subprocess that scans the channel program to determine if the channel program contains any long running command (represented in the associated long command list for the device).

If the channel program does not contain any long executing commands, the primary MIH interval is used for the I/O request. If the channel program contains at least one long executing command, the secondary MIH interval is used for the I/O request.

An interval timing process is started when the I/O request is made by the OS. This process increments a counter to measure the total time that has transpired for the I/O request since the OS made the request to its CEC's I/O subsystem. The timing process periodically compares (e.g. at a specified timer interrupt signal) its currently measured time against a chosen MIH interval value (primary or secondary MIH interval) to detect for expiration of the chosen MIH internal (called a timeout). Once a timeout has been detected, the interval timing process requests that the OS terminate the channel program of the I/O request, and to invoke normal recovery processes.

In the prior art, if a device is executing an I/O request containing a long running command, and a second OS makes an I/O request to the device (which is pending on an I/O queue), the second OS can be required to wait until after expiration of the prior provided MIH timeout and thereby falsely determine existence of an MIH error condition indicating a missing interrupt when no interrupt is in fact missing.

But with this invention, no false error condition is detected, due to a "long-busy" signal being sent to the other OS. The "long-busy" signal indicates to the second OS that it is being held up by proper operation of both it and the device, and that no I/O interrupt is in fact missing. Hence, the second OS will not be hung up waiting for its I/O request to complete. In S/390, the device will reject the next command with unit check status and sense data to indicate a 'long busy' condition exists at the device. Upon seeing the long busy condition, the second OS software has controls that readjust its internal MIH interval so the attempted I/O request remains queued for the device until a no-longer busy status is seen for the device indicating that another I/O request can now execute. Thus if the I/O request stays queued for longer than the secondary MIH time and the MIH interval expires, the timing control process may start the MIH interval over such as by simulating an interrupt to end the current MIH timeout measurement for the I/O request and signal a retry for the I/O request that will start the timeout measurement from its beginning for the retried I/O request. These retries may be under count control from device error recovery procedures in the system.

Thus, the device is put into the proper state (busy or long-busy) when it starts executing a channel program for an I/O request, and that state lasts until the request completes. The busy/long-busy state at a device may end when the associated I/O request successfully completes.

The primary and secondary MIH intervals are used by the requesting OS which has its I/O request executed by the device. The long-busy signals allow adjustments (not previously used) in the MIH interval started by other OSs having I/O requests waiting for the device.

It is also an object of this invention to operate a system under a single OS which allows overlap of a next request with a current request which has not yet completed, and still prevent false MIH error indications of missing interrupt signals, such as would occur in the scenario described at the end of the Background section herein. This invention solves the overlap and false indication problem by immediately providing a completion interrupt when a long command is accepted by an I/O control unit, even though the command had not in fact completed operation in the associated device (and it may not have even started device operation when its completion interrupt is signalled to the requesting OS). Further, in a I/O control unit (CU) capable of executing long commands, this invention also sets to an on-state a "long busy" signal when the CU sends the "immediate" interrupt signal to the central processor complex in response to CU acceptance of the "long command". "Immediate" means that the "completion interrupt" is sent to the central processor complex at the time the command is accepted at the control unit, although the device need not have then started executing the command; no interrupt signal is provided later when the device actually completes the command. The "long busy" state continues at the CU until all operations for the long command are completed by the required device. The receipt of the immediate interrupt by the OS causes it to immediately end its MIH timeout for the long command, so that the MIH process cannot then have a timeout for indicating an MIH error condition.

The long busy state of the device may at any time be tested by an OS issuing a test instruction to the CU, such as to determine whether the OS wants to delay issuing another request to that device if a long busy state exists for the device. Thus, the inventive combination of a "long busy" signal for a device, and an "immediate" interrupt signal to the OS prevents false MIH indications from occurring for long busy commands, as happened in prior MIH systems which waited for actual device operation completion before sending a completion interrupt to the OS.

At any time, the long busy state of the control unit may be tested by any executing OS to determine the availability of the associated device before issuing another I/O request for operating that device.

BRIEF DESCRIPTION OF THE DRAWINGS

FIGS. 3, 3A and 3B are a flow chart showing a control flow for the MIH initialization processing FIGS. 4A, 4B, 4C, 4D and 4E provide flow charts showing control flows in software processing for handling device dependent MIH processing for LONG-BUSY conditions, including detecting MIH timeout conditions.

FIGS. 6A, 6B and 6C are flow diagrams describing how an operating system obtains a device's self description data, which includes its PRIMARY MIH TIMEOUT interval and its SECONDARY MIH TIMEOUT interval.

DESCRIPTION OF THE PREFERRED EMBODIMENT

Figure 1:
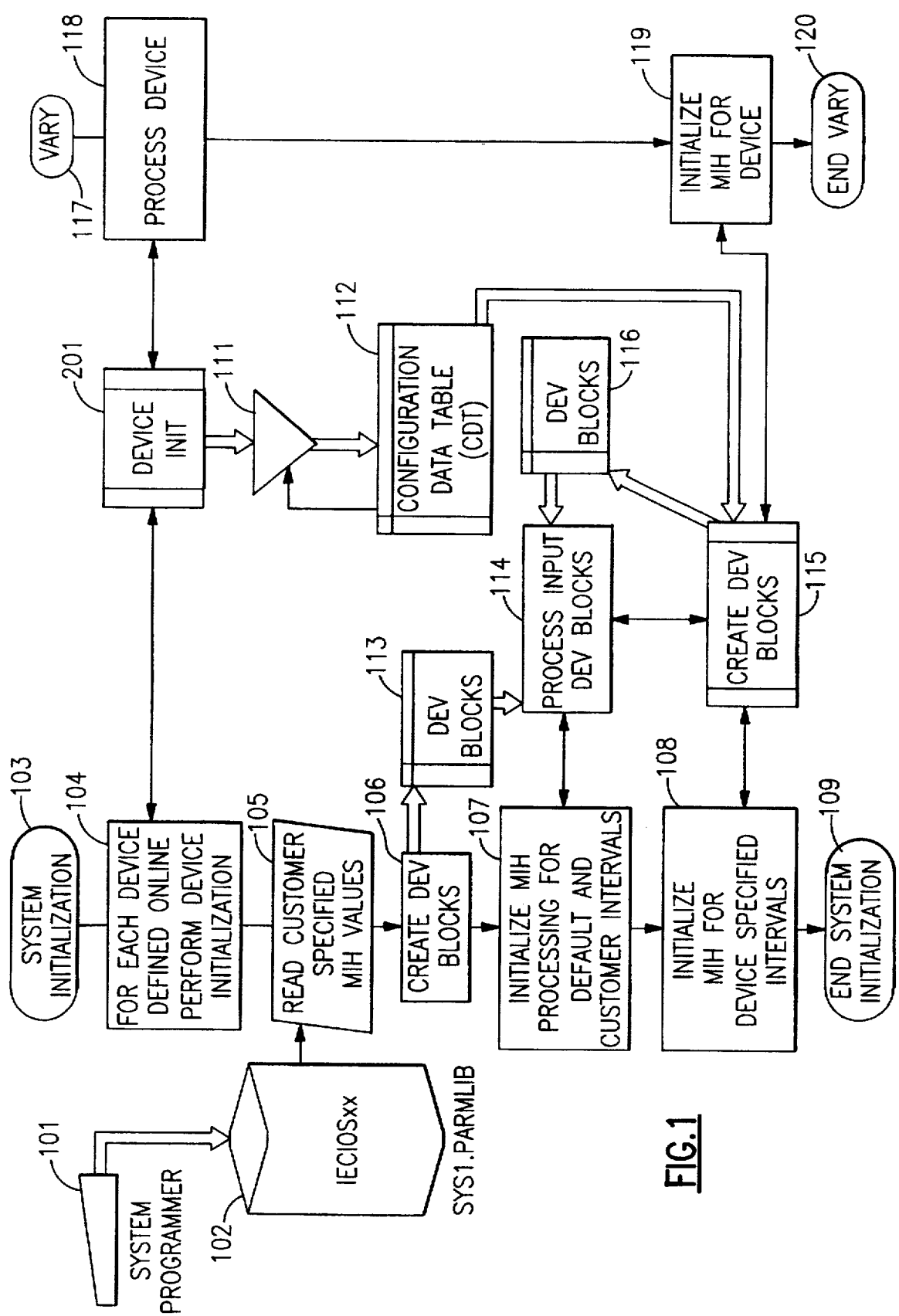
FIG. 1 is a flow chart showing a control flow for system initialization and for a VARY-command device processing, which establishes the initial missing interrupt time intervals for each device.

The environment for this preferred embodiment is described as including IBM's MVS/ESA (Enterprise System Architecture) and the IBM 3590 tape storage device. Those skilled in the art will understand that the methods described herein for this preferred embodiment may be applied to other operating systems and computer architectural platforms without deviating from the scope of the claimed invention.

Device Self Description Extensions

Devices supporting the preferred embodiment will return two new fields contained in the self description data when using the Read-Configuration-Data command, previously described herein, in the following manner:

Missing Interrupt Handler Primary Time Out (MIHPTO)

Byte 2 of word 1 (603) contains a value which specifies the control unit's recommended "primary MIH time-out interval" which is used to set the missing-interrupt-handler timeout for the device. This timeout is the longest time a channel program is expected to last, taking into account any device recovery processes, and any queuing time, as a result of a presentation of a busy or a channel command retry status if no value is specified for the missing-interrupt-handler secondary timeout. If a secondary MIH timeout is specified, then this time is the longest time a channel program (which contains no model-dependent long-running commands) is expected to take, taking into account any device recovery processing, and any queuing time, as the result of busy or channel command retry status.

The primary MIH time-out interval value is a base-ten value obtained from the mantissa and exponent specified in the primary MIH time-out interval field. A primary MIH time-out field containing this value has the format shown in FIG. 6b (604).

When the mantissa is greater than zero, bits 0–1 of byte 2 of word 1 (EX) contain an unsigned binary integer that is the exponent for primary MIH time-out values greater than zero. When the mantissa is zero, no value is specified for the primary MIH time-out value, and bits 0–1 of byte 2 of word 1 (EX) have no meaning.

Bits 2–7 of byte 2 of word 1 contain an unsigned binary integer that is the mantissa for the primary MIH time-out value. When this field contains a zero, no value is specified for the primary MIH time-out interval.

The exponent field is decoded as shown in FIG. 6C.
Secondary MIH Time Out (MIHSTO)

Byte 3 of word 1 (602) contains a value which specifies the control-unit's recommended value for the program's secondary MIH time-out interval for the device. The MIHSTO value is the larger of:

The maximum expected duration of any long-implicit allegiance formed for device dependent long-running commands, or The maximum expected duration of a device-dependent long-busy condition.

The MIHSTO value is the maximum expected duration of long-busy conditions or the longest expected execution time for channel programs containing a model-dependent long-running command, taking into account any device recovery mechanisms and any queuing time as a result of busy or channel-command-retry status.

The secondary MIH time-out value is a base-ten value based on the mantissa and exponent specified in a secondary MIH time-out field.

The secondary MIH time-out field has the format shown in FIG. 6B.

When the mantissa is greater than zero, bits 0–1 of byte 3 of word 1 (EX) contain an unsigned binary integer that is the exponent for secondary MIH time-out values greater than zero. When the mantissa is zero, no value is specified for the secondary MIH time-out interval, and bits 0–1 of byte 2 of word 1 (EX) have no meaning.

Bits 2–7 of byte 3 of word 1 (Mantissa) contain an unsigned binary integer that is the mantissa for the secondary MIH time-out value. When this field contains a zero, no value is specified for the secondary MIH time-out value.

The exponent field is decoded as shown in FIG. 6C.
Long Busy Protocol

Figure 5A:
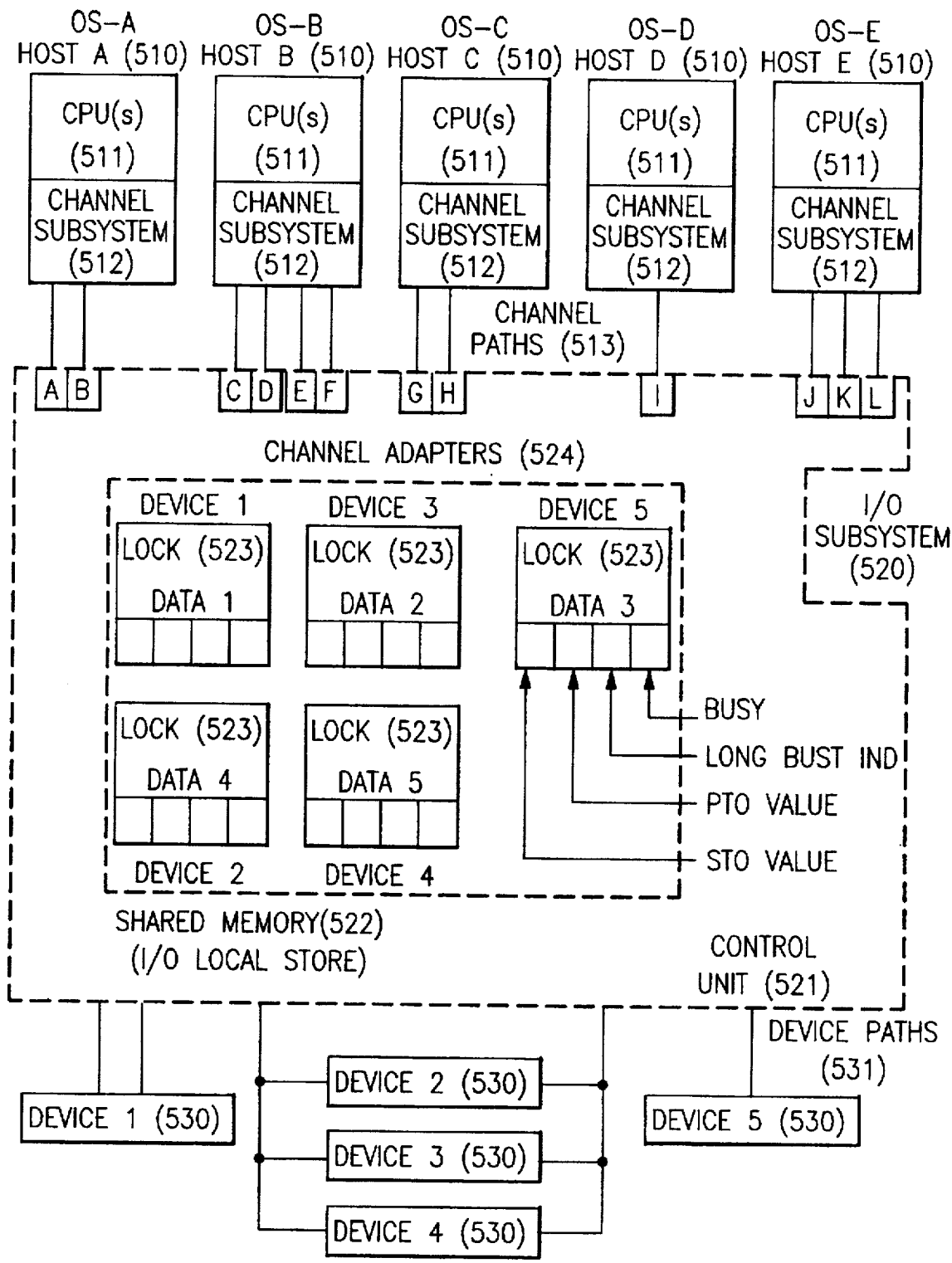
FIGS. 5A, 5B, 5C(1), 5C(2) and 5D are flow charts showing control flow for control units and their devices supporting LONG-BUSY conditions.
Figure 5B:
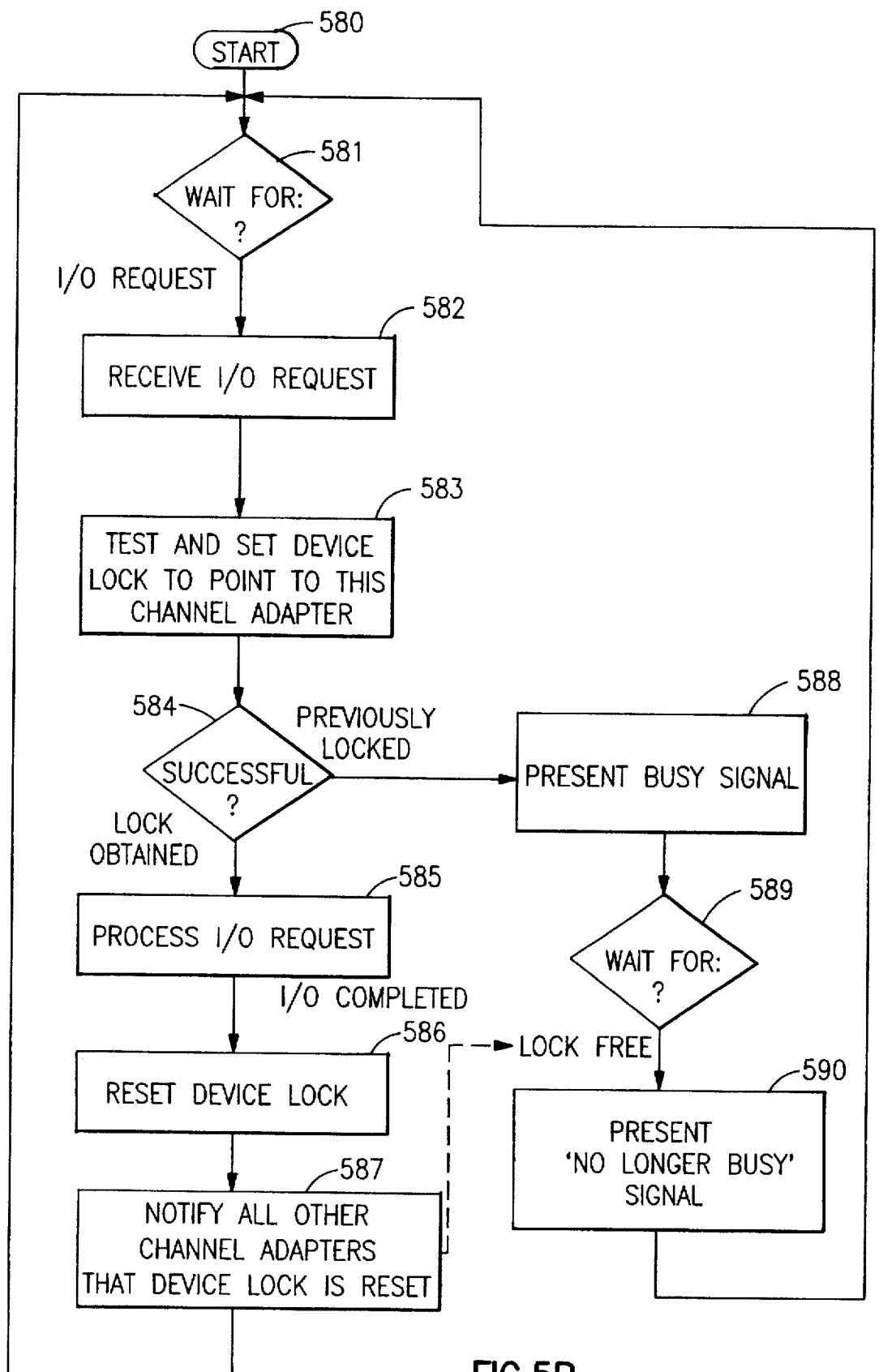

The process described herein in the section "Bounding of Queuing Durations" as follows:

The method employed here is shown in FIGS. 5C(1) and 5C(2) and is a modification of the method shown in FIG. 5b.

The method uses a CU timer for each channel adapter built into the CU. Each CU timer measures the queuing time of an I/O request received by a respective channel adapter from the time the I/O request is first received by the channel adapter until the requested device begins processing of the request. The CU timer is initially set to zero and, once started, begins to measure elapsed time. A CU timeout is detected by the control unit if the control unit timer's elapsed time exceeds a "threshold" value defined as somewhat less than the MIH time-out value currently being used by OS software monitoring the I/O request. The concept here is that the control unit is timing in order to be able to transition from an active to a long busy (LB) state.

Each channel adapter performs an atomic "test and set" operation on a lock associated with the requested device before the device is allowed to begin the I/O operation for the request. If the test and set operation is successful (i.e. the request obtains the device's lock), the I/O request is accepted and processed by the device; this may involve one or more I/O commands to the device. If the test and set operation is unsuccessful, the I/O request is presented a busy indication and the CU timer is started.

The CU timer is reset when the requesting channel adapter successfully obtains the lock for the requested device, since acceptance of the I/O request is an indication of the end of the request's queuing time. At the completion of the I/O request by the device, the other channel adapters are signaled that the lock has been reset and the device is again available. For other channel adapters which have been presented a busy indication and have not experienced a timeout, the signal causes a "no longer busy" indication to be signaled which in turn causes the channel subsystem to again reissue the I/O request to each of these channel adapters. The CU timer continues to run for each channel adapter, since the reissuance of the I/O request may again fail to get the device lock, resulting in another busy indication and a continuation of the queuing time.

Should a CU adapter threshold timeout occur, the channel adapter is conditioned to signal a unit check indication to the channel when an I/O request is next received. In the case where the timeout occurs between the presentation of a "busy" indication and a "no longer busy" indication, a "no longer busy" indication is signaled to the channel subsystem in order to get it to reissue the I/O request that is queued within the channel subsystem. The "unit check" indication is presented to the software and is accompanied by "sense" data that informs the OS software that the control unit is still functional, but that the device is in the "long busy state" (i.e. it is not responding to this I/O request because it is busy processing operations from other hosts that have exceeded the maximum queuing time on this I/O request). The normal OS software response to this indication is to wait for a "no longer long busy" indication which is presented by the channel path the next time the device lock is freed.

There are some complexities of implementation that warrant a discussion. Multipathing systems as described in the subsection "System Environment" tend to retry I/O requests over the available set of channel paths when a busy indication is received (at least in certain modes of operation where the set of channel paths associated with a given host are not coordinated as a group). As such, more than one channel adapter may end up signaling a busy indication and be primed to present a no longer busy indication. When the resulting no longer busy indications are presented, the channel subsystem will choose one of the available paths to redrive the I/O request on. There are also cases where the I/O may be terminated in the channel subsystem and not reissued at all.

Software Timeout Values

As previously described, this invention provides that a given I/O request that remains queued due to a received busy indication for the duration of the long busy timeout will be redriven and subsequently be presented a "unit check" indication that is visible to the software. The software in turn can expect that a given I/O request will either complete within the time period given by the execution time of the I/O request plus the long busy timeout or a long busy indication will be received.

Figure 5D:
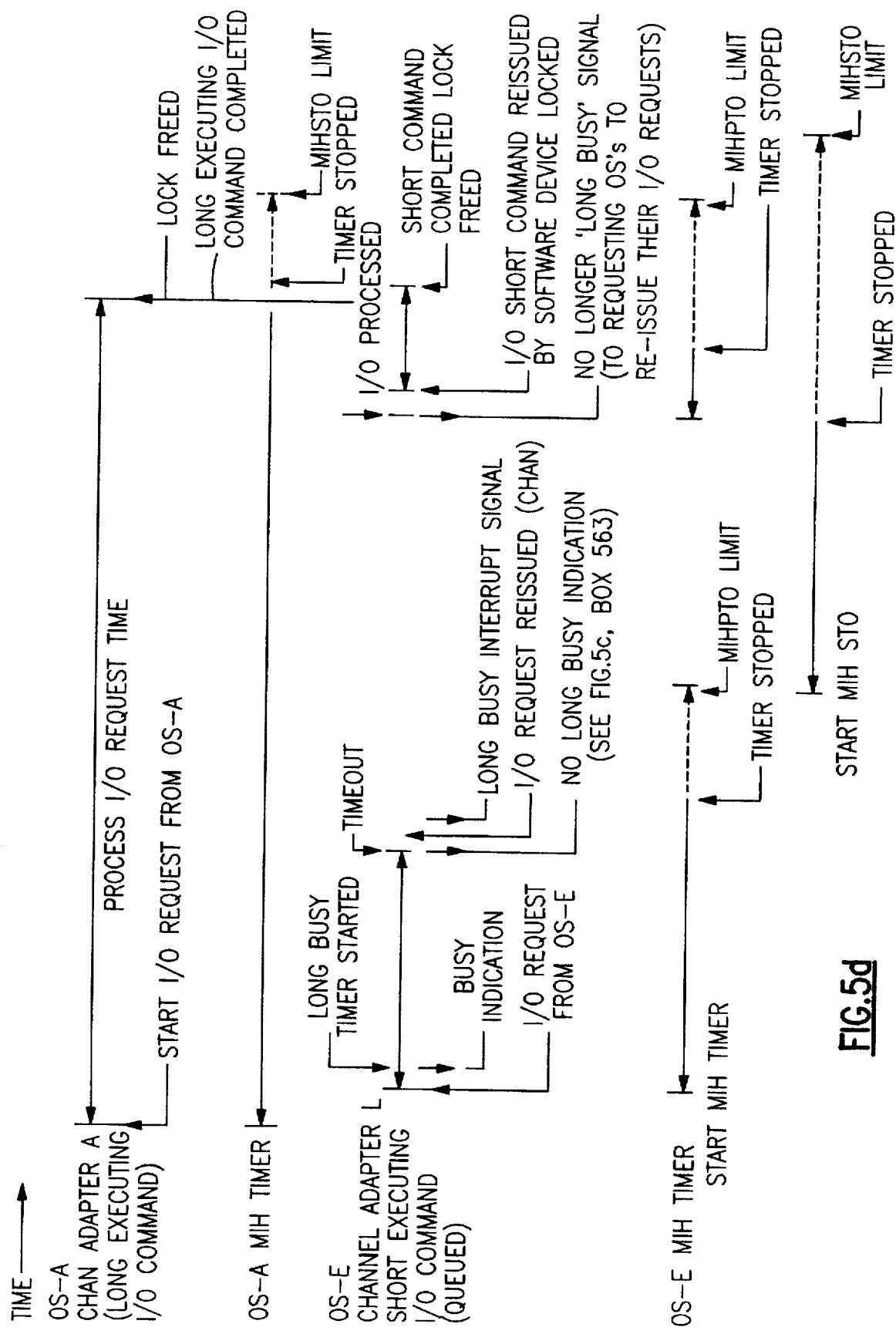

Additionally, since the "no longer long busy" indication is signaled when a device's long busy timeout has not reached its time limit and is thereby freed, the time period between receiving a "long busy" indication and a "no longer long busy" indication is bounded by the worst case execution time of any given I/O request. As determined for a given device, this timeout value can be used to ensure that the "no longer long busy" indications are not lost. The relationship between a channel path that has queued an I/O request and a channel path that is executing a long command is shown in FIG. 5d.

In order to factor in the effect of command execution times on the MIH timeouts, commands comprising the channel program for an I/O request can be divided into two classes, long and short. (Theoretically, the command classification may be done by providing more than two classes of execution times, e.g. short, intermediate and long, etc.; however, two classes are used in the preferred embodiment.) OS software analyzes the commands for a current I/O request to determine whether its channel program contains, or does not contain, a long command, and then uses the short MIH timeout value if no long executing command is found for the I/O request, which is the primary MIH timeout (MIHPTO) value. The long MIH timeout value is used if one or more long commands are found in the channel program for the I/O request, which is the secondary MIH timeout (MIHSTO).

Thus, I/O requests may be classified as either short requests (I/O requests having a channel program not containing any long executing commands), and long requests (I/O requests having a channel program containing at least one long executing commands.

The primary MIH timeout (MIHPTO) value may be determined as the execution time expected for a nominal I/O request that DOES NOT contain long commands. The secondary MIH timeout (MIHSTO) value may be determined as the sum of the execution time for the longest command and the worst case execution time for a nominal channel program of an I/O request that DOES contain long commands.

The OS software detects a missing interrupt for a short I/O request if the MIHPTO elapses before receiving an interrupt indicating either: 1) a completion indication for the short I/O request, or 2) a long busy indication for the needed device representing that the device has become busy executing a long command for another request. If a long busy indication is received, the OS software queues the I/O request and awaits the reception of an interrupt from the device signalling a "no longer long busy" indication, after which the OS software can reissue the I/O request to that device.

For a long I/O request, the OS software detects a missing interrupt from the device if the MIHSTO elapses before any interrupt is received indicating the completion of that long I/O request.

After the reception of a long busy indication by the OS software, it detects a missing interrupt if the MIHSTO elapses before receiving any "no longer long busy" indication.

System Device Initialization

Figure 2:
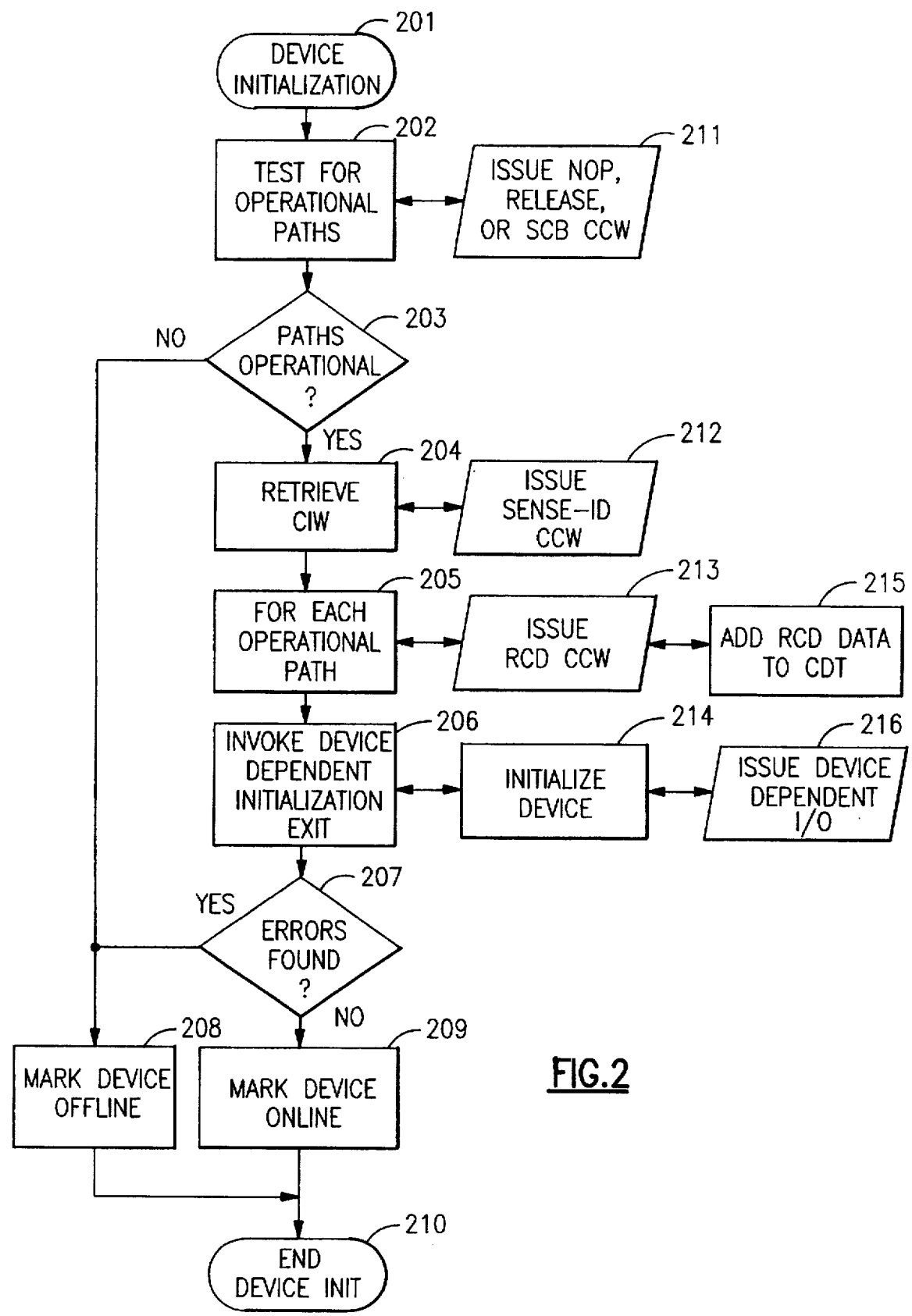
FIG. 2 is a flow chart showing a control flow for device validation and initialization which includes retrieval of the device dependent MIH time intervals.

Step 104 in FIG. 1 represents a device initialization process, which is shown in detail in FIG. 2, which performs the system initialization process for each device being defined to be online to the operating system. The device initialization process is invoked at step 201 in FIG. 2 and ensures that the device (shown in FIG. 1) is operational (202) by testing each available path to the device with an innocuous I/O command in step 211. In the case of tape drives, a nooperation (NOP) channel command is issued. If no operational path is found in step 203, the device is marked offline (208) and processing continues to the next device (104). If at least one operational path is found for the device (204), a sense-id I/O command is issued (212) in order to retrieve command information words for the device (in the current ESA/390 computer architecture). The command information word identifies the channel command that allows the program to retrieve the device self description data. For each operational path to the device (205) the read-configuration-data command is issued (213) to retrieve the device configuration data record (CDR) and add it to the OS configuration data table (CDT) in step 215.

FIG. 6A shows the device PRIMARY MIH TIMEOUT value (603) and the device SECONDARY MIH TIMEOUT value (602) contained in the CDR.

In FIG. 2, once the device self description data has been placed into the CDT in the OS, device dependent initialization procedures are invoked at step 206 to initialize system control blocks with information on how the device can and will be used. If no errors are found during the device initialization process by test step 207 the device is marked online and available for use by step 209. If errors are found by step 207, the device initialization process then marks the device offline in step 208, and the device cannot be used by applications until the error is fixed.

In FIG. 1, once all the devices have been validated and device initialization process completed at step 104, MIH initialization commences at step 105. MIH initialization first consists of reading customization data specified by the system programmer in a SYS1.PARMLIB dataset, member IECIOSxx (102). This customization data consists of the MIH timeout values that the customer wants imposed on certain I/O devices. This customization data is optional, as there are fixed MIHPTO and MIHSTO timeout default values for all device types supported by the system. The text records from the IECIOSxx member are converted into internal text records called DEV blocks in step 106 which creates one DEV block for each device MIH value written in IECIOSxx and they are chained together and anchored from an MIH processing work area 113. Later on in system initialization, when all the system services are available for use, MIH initialization continues at step 107 by processing each DEV block and creating the internal data structures necessary to enforce the MIH timeouts specified by the customer in step 114.

After all of the customer specified time intervals have been processed for system initialization step 107, those devices that did not have their MIH timeout values modified by the customer have the default PRIMARY MIH timeout values processed in step 108. This processing consists of building DEV blocks to represent the devices in step 115 and inputting them to step 114 that processes the DEV blocks with the customer input.

Figure 3B:
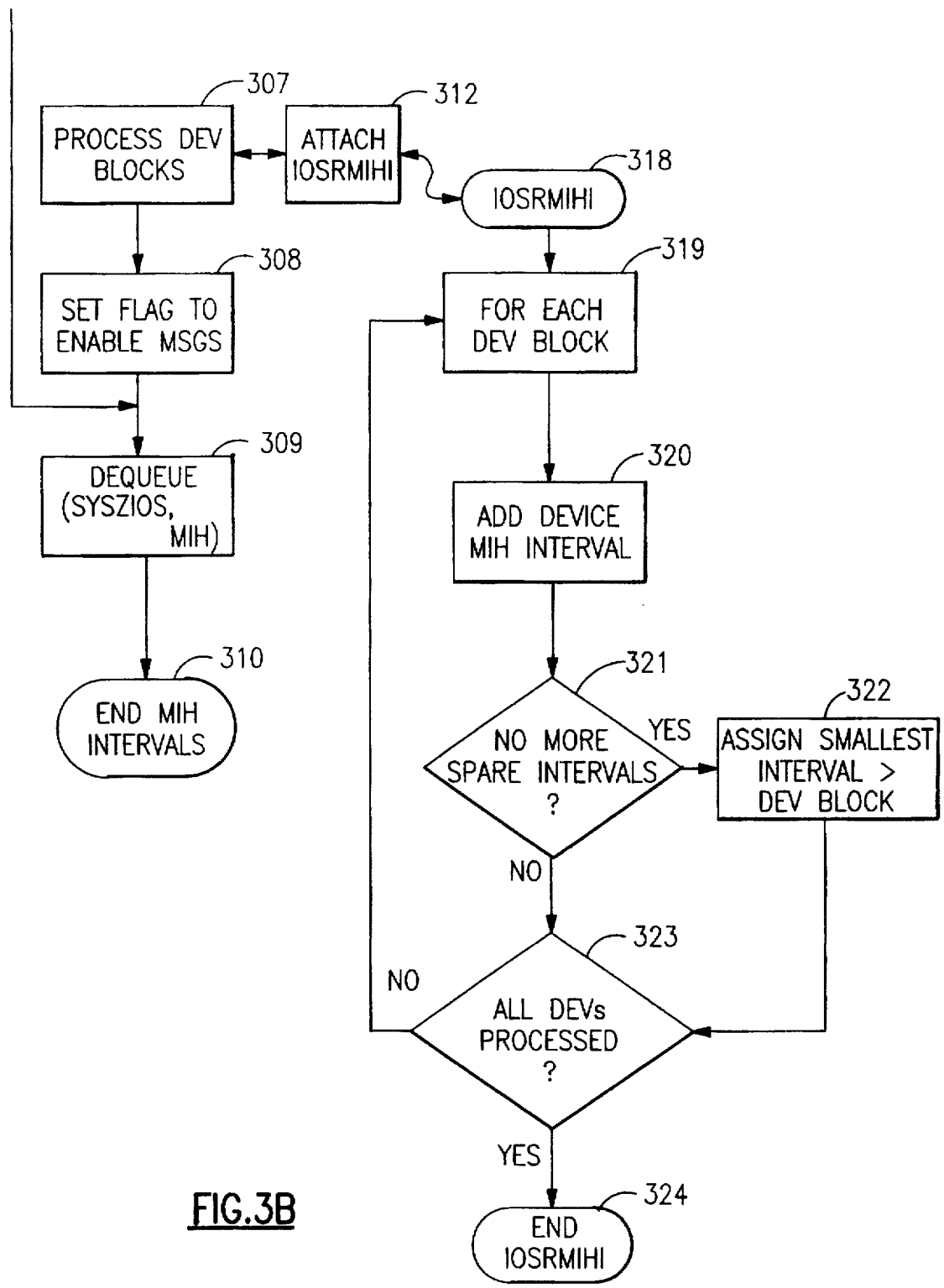

The details of the process of creating these DEV blocks with the MIH timeout values are shown in FIGS. 3A and 3B. The Device MIH Interval processing is entered at step 301 during system initialization or from a VARY device process to be described later. Step 302 enqueues the device block to serialize its access against other MIH processing that could be the result from other MVS commands, such as SET IOS=xx and SETIOS MIH, . . . that modify the MIH processing for the devices. Once the system enqueue is obtained, each device in the system is examined (303) to determine if the installation already specified an MIH interval in IECIOSxx (102). If the customer did already specify an interval (311) then processing continues to the next device (304). However, if the customer did not specify an MIH interval then the MIH primary timeout value is retrieved (313) for that device from the configuration data table (112). If the MIH primary timeout value is not zero (314) then a DEV block is built to represent the device (315). The DEV block is then anchored onto a global queue of DEV blocks (316) and processing continues to the next device in the system (304). Once all the devices in the system have been processed a check is made to see if any DEV blocks have been created (305). If no DEV blocks have been created then processing terminates by freeing the MIH enqueue (309) by dequeuing it, and returning control to the caller (310).

However, when DEV blocks have been queued in step 302, then they are processed by first setting a flag so that all message processing is skipped (306). Message processing is skipped because these MIH changes are not from an explicit customer command. Next, the MIH Initialization process (IOSRMIHI) is invoked at step 312 to process the queued DEV blocks in the same way that customer specified MIH intervals are processed (318). After the IOSRMIHI completes processing, message processing is enabled again (308), the MIH enqueue is released (309) and control is returned to the caller (310).

With this invention, the MIH timeout values (MIHPTO and MIHSTO) may be uniquely assigned to each device. It is expected that values other than the OS defaults will be commonly used. If more unique MIH timeout values are used for the devices than the OS can support (MVS can support 256 unique MIH timeout values) then special processing is needed to handle the devices. In MVS, if no more unique MIH scan interval is available (step 321), then MVS assigns the smallest available interval greater than the value requested by the device (322). This insures that I/O operations are not prematurely terminated while providing the most responsive time for detecting device failures. If there are no intervals available greater than the primary MIH timeout value contained in the DEV block, then the default MIH time for the device class is used.

Once system initialization completes (109) the system can modify the configuration table by adding new devices or simply issuing the MVS VARY device command to bring offline devices online (117). Whenever offline devices are brought online, they undergo the same device initialization process (201 in FIG. 1, and all of FIG. 2) that was performed during system initialization and described in FIG. 2. After the device initialization process is done, DEV blocks are created and processed in the same way they were processed during system initialization (FIG. 1).

Once the Operating System is initialized and jobs begin to run on the system, I/O requests are issued by the OS to its I/O supervisor for execution at the device, and are timed by the Missing Interrupt Handler subcomponent of the type described in prior U.S. Pat. No. 5,388,254.

Three new fields are added to the operating system's internal representation for each device implementing this invention:

Long busy indicator

A bit indicating that the last I/O request to the device encountered a long busy indication (unit check with sense data). Long busy is a signal from the device issued when the device is executing a command chain that contains a long running command or when the sub-system enters a processing state that will take a long time and that precludes the subsystem from accepting any commands while it is busy.
LBREDRIVE indicator A bit indicating that while in the long busy state an I/O request was re-issued by the OS to the device after the elapsed time was greater than the MIHSTO value.
Accumulated MIH time A field representing the total time that a device remains in the long busy state (this elapsed time starts when the long busy indicator is set for the device.

Figure 4A:
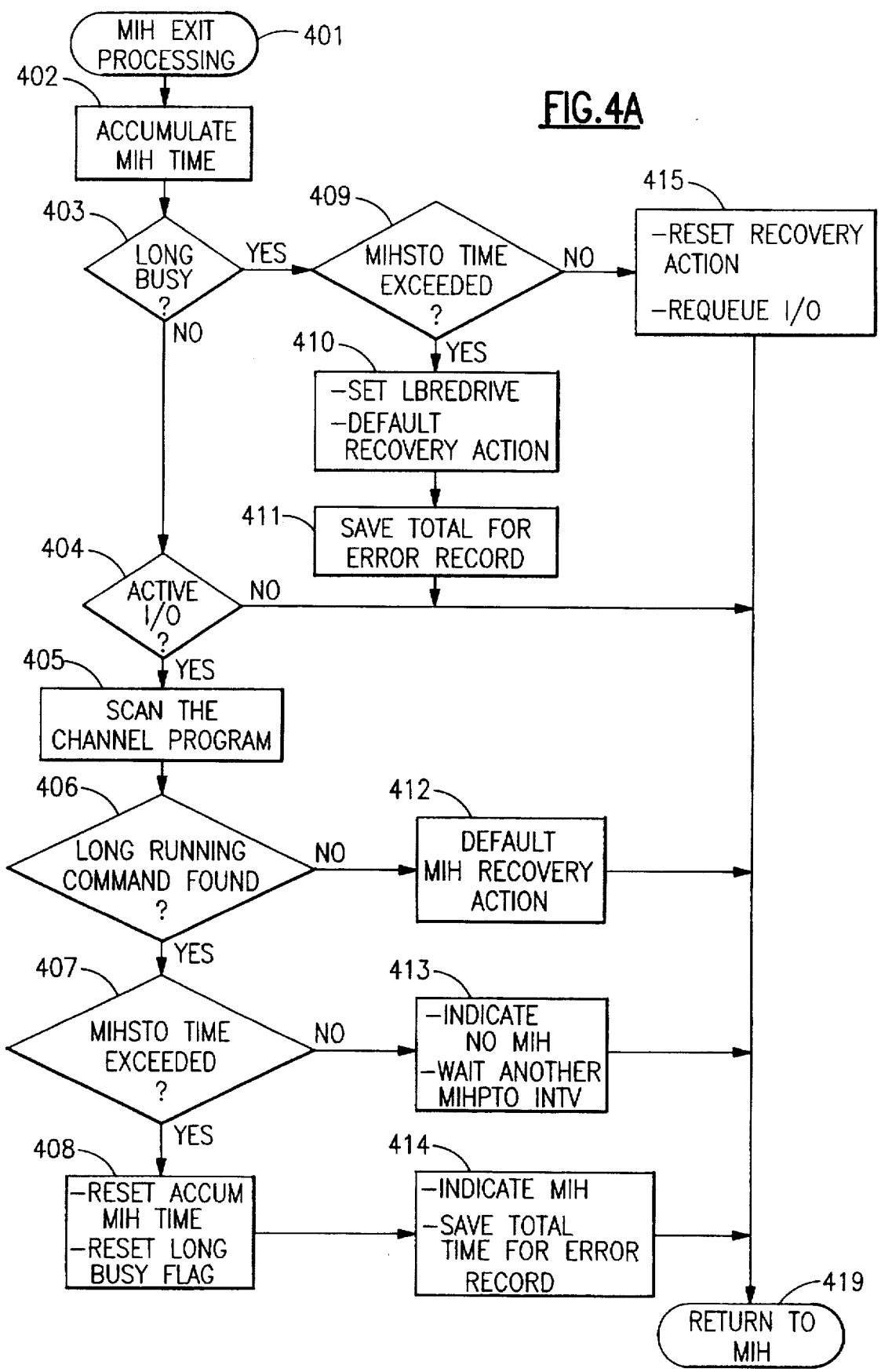

In the OS when the primary MIH time interval has expired (accumulated time>MIHPTO) for an active or queued I/O request, OS considers the device eligible for MIH recovery and exits to device dependent MIH Exit processing shown in FIG. 4a. The MIH exit is entered at step 401 after the primary time interval has expired. Step 402 accumulates the total elapsed time that the I/O request is pending at the device. Step 403 tests if the device is indicated in the LONG BUSY state (while the I/O request remains queued and not active), then the total accumulating time is compared to the MIHSTO time for the device (409). If the MIHSTO time is exceeded, then step 410 turns on the LBREDRIVE bit to indicate that MIH has been entered to redrive the request, and step 410 goes back to MIH to restart the queued request after step 411 saves the total time accumulated for the request for an error record recorded in the system error log by MIH.

If the total accumulated time has NOT exceeded the MIHSTO timeout interval, step 415 is performed which resets the error recovery action, requeues the I/O request for reissue, and returns to the MIH process.

If step 403 finds the device is not in the long busy state and step 404 finds an active channel program, then step 405 scans the channel program to determine if it contains any long running command. The following are examples of long running commands for controlling an IBM 3590 tape device:

REWIND, FORWARD SPACE FILE, BACKWARD SPACE FILE, LOCATE BLOCK, FORMAT, ERASE, DATA SECURITY ERASE, UNLOAD, LOAD, MOVE

If a long running command is not found in the I/O request's program, step 412 requests normal MIH recovery. However, if a long running command was found by step 406, the total accumulated time is compared to the MIHSTO value. Step 407 determines if the accumulated time exceeds the MIHSTO value. If the value is not exceeded, step 413 indicates that the MIH processor wait another MIH interval (MIHPTO), before returning to the MIH Device Dependent Exit. If while the MIH processor is waiting for another MIH interval to elapse the channel program completes the MIH Device Dependent Exit will not be reentered for this I/O. But if step 407 finds the total accumulated time does exceed the MIHSTO, step 414 then resets to zero the total accumulated time, resets the long busy flag, and saves the total accumulated time in an error recovery record. The MIH process is reentered.

Figure 4B:
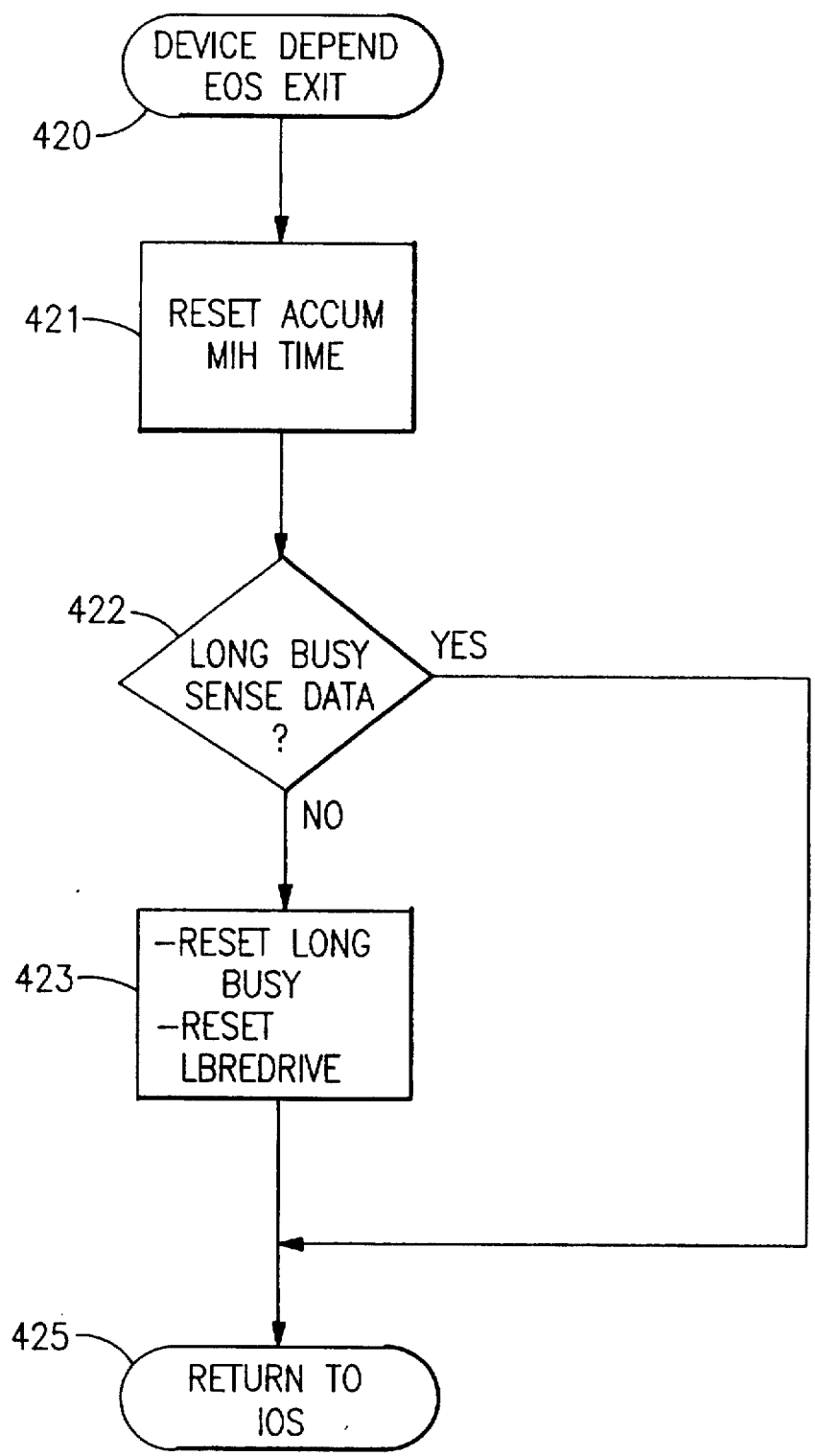
Figure 4C:
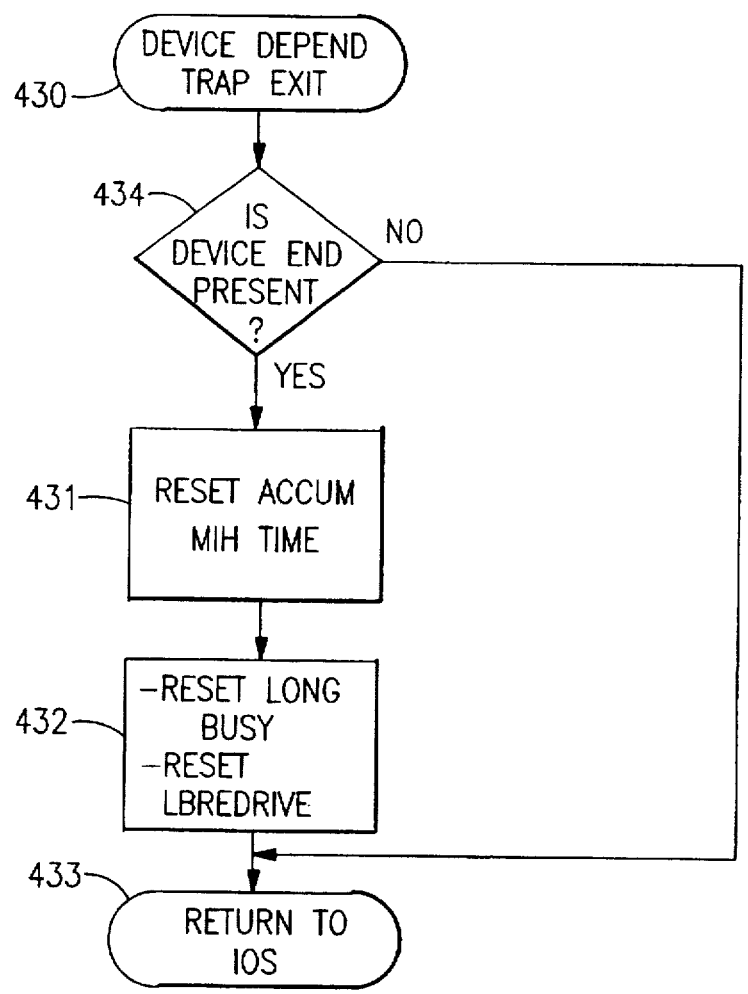

Any time an active I/O request completes, the process shown in FIG. 4b or FIG. 4c is used to reset the accumulated time to zero and to reset any long busy indication for the device, and resets the LBREDRIVE flag. FIG. 4b represents a device dependent End-of-Sense (EOS) Exit which processes a device end signal when unit check is also present for a device completing the I/O request. In this process, step 421 is invoked after the sense data has been read to reset to zero the total accumulated time for the request. Step 422 tests for existence of a "long busy" indication associated with the sense signal. If step 422 does not find long busy sense data, then step 423 resets the long busy indication for the device, and resets the LBREDRIVE flag. If step 422 finds long busy sense data or after step 423, a return is made to the IOS (I/O System) software in the OS which contains the MIH routine that controls the MIH operations for the OS.

A device dependent trap exit routine (430) in the MIH process is represented in FIG. 4C, and this trap control process gets control whenever a device completes and provides a device end signal without unit check. Then, step 431 resets to zero the total accumulated time for the request, and step 423 resets any long busy indication for the device, and resets the LBREDRIVE flag, and a return is made to IOS.

Figure 4D:
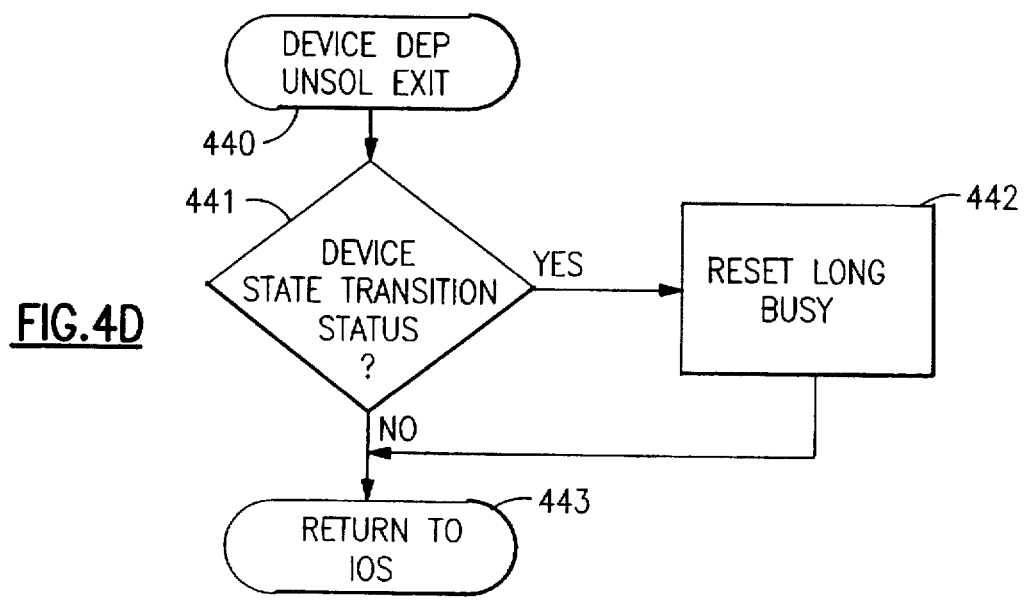

Any time an unsolicited interrupt occurs for a device, the device dependent Unsolicited Interrupt Exit (Device Dep Unsol Exit) code is entered at step 440 shown in FIG. 4d. If the next step 441 finds the status for the interrupt indicates a device state change has occurred, step 442 resets the long busy indicator.

Figure 4E:
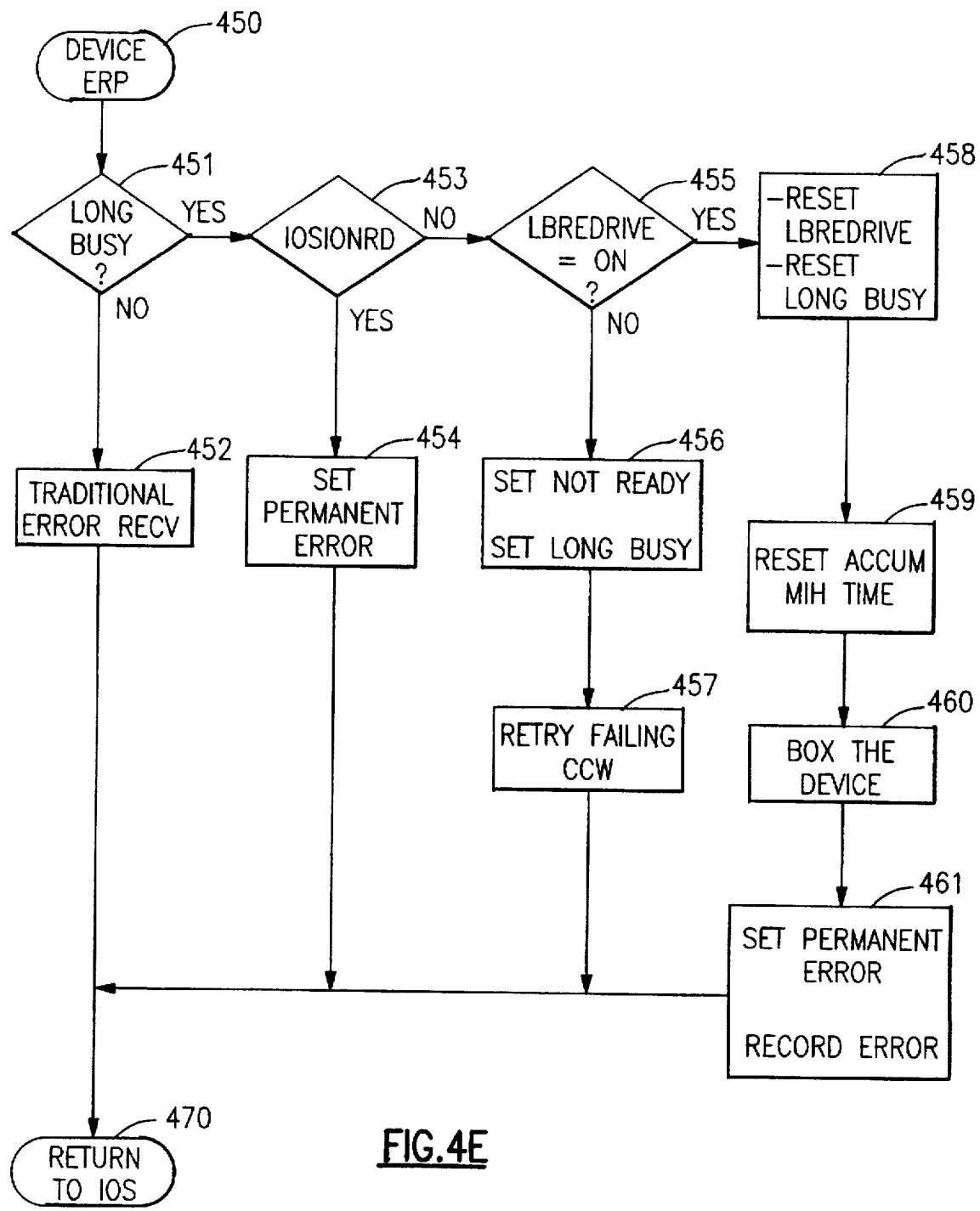

When an I/O request encounters an error, a device dependent Error Recovery Procedure (Device ERP) is invoked, which is shown in FIG. 4e. Step 451 determines if the I/O error was caused by a long busy condition, and if not, step 452 performs traditional error recovery processes in step 452, which may include retrying the I/O operation, and returns to IOS. If, however, step 451 finds the error was due to a long busy condition, then the I/O request is checked to see if it needs to execute even if the device is not ready by performing step 453. If the I/O does need to execute to satisfy the ERP, then step 454 marks the I/O request in permanent error and the job is posted in step 470. If the I/O does not require execution when the device is not ready, the LBREDRIVE bit is checked in step 455 to see if the request was redriven from MIH. If the request was redriven from MIH and is still in the long busy state—then the device is considered to be in permanent error. In steps 458 and 459 the long busy indicator and LBREDRIVE flags, and total accumulated times are reset. The device is then forced offline and marked such that all new I/O requests are rejected with a permanent I/O error by step 460. Finally, the current I/O request is marked with a permanent error by step 461, and the job posted in step 470. If the LBREDRIVE flag was not on, then step 456 marks the device as being in the long busy state so that a retry of the failing channel program by step 457 will stayed queued inside of IOS, waiting for the long busy to subside (FIG. 4d), and monitored by MIH to cap the total long busy time (FIG. 4a), described above.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

Having thus described our invention, what we claim as new and desire to secure by Letters Patent is:

1. A method for use in a computer arrangement having a plurality of operating systems (OSs) in which each OS has a missing interrupt handler (MIH) process for detecting a failed input/output (I/O) device operation for an I/O request issued by the OS to an I/O subsystem, the OSs sharing at least one I/O controller connected to I/O devices, the MIH process comprising the steps of;

storing a plurality of MIH timeout extension values in the computer arrangement accessible to the MIH process including a primary timeout value and a secondary timeout value, storing at least one CU threshold timeout value accessible to the CU, sending an I/O request from the OS to the CU for an operation by an I/O device connected to the CU, and rejecting the I/O request by the CU if the I/O device is not then available for use by the I/O request, starting a MIH timer process from a zero time value and using the primary timeout value as a current MIH timeout value for the I/O request when the I/O request is sent to the CU, and signalling an MIH timeout when and if the MIH timer process reaches a time equal to or greater than the current MIH timeout value, contending by the I/O request with any other concurrent I/O requests in the CU for use of the I/O device, initiating an CU threshold timer process from a zero time value to measure CU threshold elapsed time for the I/O request if the I/O request is rejected by the CU when the I/O device is busy, indicating a CU threshold timeout if elapsed time measured by the CU threshold timer process is equal to or greater than the CU threshold timeout value, CU signalling a long-busy interrupt to the OS when and if the CU threshold timer process indicates the CU threshold timeout, replacing the current MIH timeout value with the MIH secondary timeout value for an OS timer process in response to the CU signalling of the long-busy interrupt, and signalling the MIH timeout when and if the MIH timer process reaches an elapsed time equal to or greater than the MIH secondary timeout value to indicate the I/O device operation has failed.

2. A method of avoiding false detection of missing I/O interrupt signals by a operating system (OS) in a data processing system having one or more OSs capable of sharing I/O devices as defined in claim 1, further comprising the steps of:

storing at the I/O controller a subset of long command representations with associated timeout parameters, comparing by the I/O controller a command code received with each command and codes stored with the long command representations in the stored subset, accessing by the I/O controller a timeout parameter associated with any long command representation in the stored subset having a code equal to the command code received by the I/O controller for an I/O request of an OS, and copying the timeout parameter into an OS storage, and communicating a concurrent interrupt signal from the I/O controller to the OS for the OS to use the timeout parameter to time when the I/O request is expected to be completed.

3. A MIH process as defined in claim 1, further comprising the steps of:

ending operation of the MIH timer process for the I/O request if and when the I/O device accepts the I/O request for an operation before occurrence of an MIH timeout.

4. A MIH process as defined in claim 1, further comprising the steps of:

ending operation of the CU threshold timer process for the I/O request if the I/O device accepts the I/O request for an operation before occurrence of the CU threshold timeout.

5. A MIH process as defined in claim 1, further comprising the steps of:

releasing CU resources used by the I/O request when the long-busy interrupt is signalled to the OS to enable the CU resources to be used by another I/O request, and queuing the I/O request in an OS I/O queue while the I/O request is waiting for availability of the I/O device.

6. A MIH process as defined in claim 5, further comprising the steps of:

completion-signalling by the CU to the OS when the device becomes available for use by another I/O request, and re-driving the I/O request by the OS in response to receiving the completion-signalling from the CU to re-issue the I/O request to the CU to enable the I/O request to again contend for use of the I/O device.

7. A MIH process as defined in claim 5, further comprising the steps of:

using one of a plurality of channel interface adapters in the CU as the CU resource used by the I/O request, and releasing the channel interface adapter by the CU when and if the long-busy interrupt is sent to the OS by the CU.

8. A method for use in a computer arrangement having a plurality of operating systems (OSs) in which each OS has a missing interrupt handler (MIH) process for detecting a failed input/output (I/O) device operation for an I/O request issued by the OS to an I/O subsystem, the OSs sharing at least one I/O controller connected to I/O devices, the MIH process comprising the steps of:

storing a plurality of MIH timeout extension values in the computer arrangement accessible to the MIH process including a primary timeout value and a plurality of secondary timeout values, storing a plurality of control unit (CU) threshold timeout values accessible to the CU including a first CU threshold timeout value and a plurality of secondary threshold timeout values, sending an I/O request from the OS to the CU for an operation by an I/O device connected to the CU, and rejecting the I/O request by the CU if the I/O device is not then available for use by the I/O request, starting an MIH timer process from a zero time value and initially using the primary timeout value as a current MIH timeout value for the I/O request when the I/O request is sent to the CU, and signalling an MIH timeout when and if the MIH timer process reaches a time equal to or greater than the current MIH timeout value, contending by the I/O request with any other concurrent I/O requests in the CU for use of the I/O device, initiating an CU threshold timer process to measure CU threshold elapsed time for the I/O request from a zero time value and initially using the primary threshold value as a current CU threshold value if the I/O request is rejected by the CU when the I/O device is busy, indicating a CU threshold timeout if elapsed time measured by the CU threshold timer process is equal to or greater than the current CU threshold value, CU signalling a long-busy interrupt to the OS when and if the CU threshold timer process indicates the CU threshold timeout, replacing the current MIH timeout value with a next one of the plurality of MIH secondary timeout values for the OS timer process in response to the CU signalling of the long-busy interrupt, and replacing the current CU threshold value with a next one of the plurality of CU threshold values for the CU timer process in response to the CU signalling of the long-busy interrupt, and signalling the MIH timeout when and if the MIH timer process reaches an elapsed time equal to or greater than the current MIH timeout value to indicate the I/O device operation has failed.

9. A MIH process as defined in claim 8, further comprising the steps of:

sizing each of the plurality of MIH secondary timeout extension values unequal to each other.

10. A MIH process as defined in claim 9, further comprising the steps of:

sizing each of the plurality of CU secondary threshold timeout values measure a shorter time period than a corresponding MIH secondary timeout extension value.

11. A method of avoiding false detection of missing I/O interrupt signals by an operating system (OS) in a data processing system having one or more OSs capable of sharing I/O devices, an I/O controller in the data processing system for receiving I/O requests issued by an OS for use of an I/O device connected to the I/O Controller, the method comprising the steps of:

delaying a received I/O request in the I/O Controller when an I/O device required by the I/O request is busy and non-available for use by the I/O request, communicating a long-busy delay signal from the I/O Controller to the OS as an error interrupt with status information indicating the error interrupt to simulate a long-busy interrupt when the I/O Controller detects the delay has reached a predetermined threshold time from when the I/O request was received by the I/O Controller and the I/O Controller knows the I/O device is then operational and not available to the I/O request, and extending a MIH (missing interrupt handler) primary timeout period by a predetermined time extension in response to the OS receiving the long-busy delay signal from the CU.

12. A data processing system executing a plurality of operating systems (OSs) having MIH handlers as defined in claim 11, further comprising the steps of:

simulating the long-busy delay signal from the CU to the OS by sending an error-indicating interrupt signal with status information indicating the error-indicating interrupt signal represents the long-busy interrupt signal.

13. A data processing system executing a plurality of operating systems (OSs) having MIH handlers as defined in claim 11, further comprising the steps of:

detecting by the OS a long-busy (LB) interrupt signal received in response to the redriving step as a rejection of the I/O request reissued by the OS for indicating a device needed is busy with another I/O request which contains a long command, and further extending the MIH timeout interval for the OS when a long busy interrupt signal is received prior to the timeout occurring.

14. A method of avoiding false detection of missing I/O interrupt signals by a operating system (OS) in a data processing system having one or more OSs capable of sharing I/O devices as defined in claim 11, further comprising the steps of:

detecting a long command received by the CU by storing therein a set of parameters representing respective timeout values for various commands and the set of long commands possible and determining upon detection of a timeout whether or not any received command matches any parameter in the set.

15. A method of avoiding false detection of missing I/O interrupt signals by a operating system (OS) in a data processing system having one or more OSs capable of sharing I/O devices as defined in claim 11, further comprising the steps of:

starting a MIH timeout interval for a requester OS only when a request by the requestor OS is signalled as accepted by the CU for the I/O device.

16. A method of avoiding false detection of missing I/O interrupt signals by a operating system (OS) in a data processing system having one or more OSs capable of sharing I/O devices as defined in claim 11, further comprising the steps of:

storing for the I/O controller an identifier of each rejected OS for which a rejection was issued due to an existing long-busy indication, and signalling a no-longer long-busy signal for each rejected OS indicated by the last storing step when execution completes for the command for which the existing long-busy indication was set.

17. A method of avoiding false detection of missing I/O interrupt signals by a operating system (OS) in a data processing system having one or more OSs capable of sharing I/O devices as defined in claim 11, further comprising the steps of:

storing for each OS a primary MIH timeout interval and a secondary MIH timeout interval, accessing and using by an OS the primary MIH timeout interval to detect for missing interrupts when a short command is issued by the OS for an I/O device, and accessing and using by an OS the secondary MIH timeout interval to detect for missing interrupts when a long command is issued by the OS for an I/O device.

18. A method of avoiding false detection of missing I/O interrupt signals by a operating system (OS) in a data processing system having one or more OSs capable of sharing I/O devices as defined in claim 17, further comprising the steps of:

scanning a channel program associated with an I/O request to be made by an OS for using an I/O device to determine the existence of long commands in the channel program, indicating if the channel program contains or does not contain any long command, assigning a primary MIH timeout interval for detecting any missing interrupt for the I/O request if the channel program does not contain any long command, and assigning a secondary MIH timeout interval for detecting any missing interrupt for the I/O request if the channel program does contain any long command to enable a MIH detection process to have short timeouts for detecting missing interrupts for short commands.

19. A method of avoiding false detection of missing I/O interrupt signals by a operating system (OS) in a data processing system having one or more OSs capable of sharing I/O devices as defined in claim 18, further comprising the steps of:

storing in each I/O controller a primary MIH timeout interval and a secondary MIH timeout interval for use with commands directed to devices connected to the I/O controller, and accessing the primary MIH timeout interval and the secondary MIH timeout interval from the I/O controller for storage accessibility by the OS prior to issuing any command for the I/O controller.

* * * * *